(12) United States Patent
Onoue

(10) Patent No.: US 9,461,830 B2
(45) Date of Patent: Oct. 4, 2016

(54) MULTICAST TECHNIQUE MANAGING MULTICAST ADDRESS

(71) Applicant: FUJITSU LIMITED, Kawasaki-shi (JP)

(72) Inventor: Koichi Onoue, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 297 days.

(21) Appl. No.: 13/743,395

(22) Filed: Jan. 17, 2013

(65) Prior Publication Data
US 2013/0242995 A1  Sep. 19, 2013

(30) Foreign Application Priority Data

Mar. 15, 2012  (JP) .................................. 2012-059202

(51) Int. Cl.
*H04L 12/18* (2006.01)
(52) U.S. Cl.
CPC ..................... *H04L 12/18* (2013.01)
(58) Field of Classification Search
CPC ....... H04L 12/18; H04L 12/28; H04L 12/56; H04L 29/06; H04L 29/12
See application file for complete search history.

(56) References Cited

U.S. PATENT DOCUMENTS

2003/0095523 A1* 5/2003 Korus et al. .................. 370/338
2007/0286093 A1* 12/2007 Cai ......................... H04L 45/16
370/254
2009/0190587 A1  7/2009 Zhao et al.
2011/0205904 A1* 8/2011 Nakagawa ............. H04L 12/18
370/241

FOREIGN PATENT DOCUMENTS

JP  11-331237     11/1999
JP  2008-060631    3/2008
JP  2009-278298 A 11/2009

OTHER PUBLICATIONS

Mahalingam et al., "VXLAN: A Framework for Overlaying Virtualized Layer 2 Networks over Layer 3 Network", Aug. 26, 2011, URL: http://tools.ietf.org/html/draft-mahalingam-dutt-dcops-vxlan-00.
Sridharan et al., "NVGRE: Network Virtualization using Generic Routing Encapsulation", Sep. 2011, URL: http://tools.ietf.org/html/draft-sridharan-virtualization-nvgre-00.
Barabash et al., "A Case for Overlays in DCN Virtualization", 3rd Workshop on Data Center—Converged and Virtual Ethernet Switching (DC CAVES), 23rd International Teletraffic Congress (ITC 23), Sep. 2011.

(Continued)

*Primary Examiner* — Anez Ebrahim
(74) *Attorney, Agent, or Firm* — Fujitsu Patent Center

(57) ABSTRACT

A disclosed information processing apparatus, which is used in a multi-tenant network connected to the relay apparatuses, includes: an allocation unit that allocates, upon receipt of an allocation request including a first multicast address and a first tenant identification information from a relay apparatus, a second multicast address that is a multicast address, which is not allocated to any multicast domains, to a multicast domain identified by a combination of the first multicast address and the first tenant identification information; and a transmission unit that transmits the second multicast address to at least the relay apparatus that is a transmission source of the allocation request.

13 Claims, 21 Drawing Sheets

(56) References Cited

OTHER PUBLICATIONS

Cain et al., "Internet Group Management Protocol, Version 3"; RFC3376, Oct. 2002, URL: https://tools.ietf.org/html/rfc3376.

Japanese Office Action mailed Oct. 6, 2015 for corresponding Japanese Patent Application No. 2012-059202, with Partial English Translation, 4 pages.

* cited by examiner

| TENANT ID | INNER MULTICAST ADDRESS | OUTER MULTICAST ADDRESS |
|---|---|---|
| 1 | 01:00:5e:11:11:11 | 01:00:5e:00:11:aa |

| MULTICAST MAC ADDRESS | PORT IDENTIFIER |
|---|---|
| 01:00:5e:11:11:11 | vp1 |

| MULTICAST MAC ADDRESS | PORT IDENTIFIER |
|---|---|
| 01:00:5e:00:11:aa | pp1 |

MULTICAST TECHNIQUE MANAGING MULTICAST ADDRESS

CROSS-REFERENCE TO RELATED APPLICATIONS

This application is based upon and claims the benefit of priority of the prior Japanese Patent Application No. 2012-059202, filed on Mar. 15, 2012, the entire contents of which are incorporated herein by reference.

FIELD

This invention relates to a multicast technique.

BACKGROUND

In a data center that uses a virtual machine monitor, plural different users (for example, companies or the like) share resources such as a network, and taking into consideration security and logically dividing resources for each user are requested. Divided resources or users that use the divided resources may be called "tenants", and this kind of network may be called a "multi-tenant network".

Conventionally, there is a technique for making it impossible for virtual machines (VM) of other tenants in the data center to receive broadcast communication data that is transmitted by the VM of a specific tenant in the multi-tenant network. More specifically, a header that includes identification information for identifying a tenant is attached to the outside of communication data (that is, the communication data is encapsulated). Moreover, a multicast address is assigned to each tenant, and data for managing the correlation between tenant identification information and multicast address is given a switch. Then, the switch identifies a multicast address that corresponds to the tenant identification information that is attached to broadcast communication data, and transfers communication data to the identified multicast address.

However, in this technique, communication data is transmitted to the same tenant VM regardless of whether or not communication data was requested, so there is a problem in that the load on the network becomes large. Reducing the burden on the administrator that manages the switches is also not taken into consideration.

Moreover, there is a technique for performing verification of multicast communication in a switch. More specifically, the verification is performed using a verification table for a terminal that transmitted an Internet Group Management Protocol (IGMP) Membership Report, and data is registered in a forwarding table only for an allowed terminal. As a result, it is possible to transmit multicast data only to the allowed terminal. However, in this technique, there is a problem in that a verification table is set beforehand by an administrator or the like, so the management cost increases. It is also not possible to flexibly build a multicast domain.

Moreover, there is a technique for suitably transferring multicast data by providing plural correspondence tables in a relay apparatus such as a switch and router. However, in this technique as well, an administrator sets the correspondence tables in advance, so there is a problem in the management costs. This technique also does not take into consideration encapsulation of the communication data.

In other words, there is no technique for automatically building appropriate multicast domain in a multi-tenant network.

SUMMARY

An information processing apparatus relating to a first aspect includes: (A) an allocation unit that allocates, upon receipt of an allocation request including a first multicast address and a first tenant identification information from a relay apparatus, a second multicast address that is a multicast address, which is not allocated to any multicast domains, to a multicast domain identified by a combination of the first multicast address and the first tenant identification information; and (B) a transmission unit that transmits the second multicast address to at least the relay apparatus that is a transmission source of the allocation request.

A relay apparatus relating to a second aspect includes: (C) a data storage unit storing an allocated multicast address allocated to a multicast domain identified by a combination of a multicast address and tenant identification information in association with the combination; (D) a transmission unit that transmits an allocation request including a first multicast address and first tenant identification information to a management apparatus managing allocation of allocated multicast addresses; and (E) a storing processing unit that stores, upon receipt of a first allocated multicast address allocated to a multicast domain identified by a combination of the first multicast address and the first tenant identification information from the management apparatus, the first allocated multicast address in the data storage unit in association with the combination of the first multicast address and the first tenant identification information.

An information processing system relating to a third aspect includes (F) a relay apparatus, and (G) a management apparatus. Then, the aforementioned relay apparatus includes (f1) a data storage unit storing an allocated multicast address allocated to a multicast domain identified by a combination of a multicast address and tenant identification information in association with the combination; (f2) a first transmission unit that transmits an allocation request including a first multicast address and first tenant identification information to the management apparatus; and (f3) a storing processing unit that stores, upon receipt of a first allocated multicast address allocated to a multicast domain identified by a combination of the first multicast address and the first tenant identification information from the management apparatus, the first allocated multicast address in the data storage unit in association with the combination of the first multicast address and the first tenant identification information. Moreover, the aforementioned management apparatus includes (g1) an allocation unit that allocates, upon receipt of the allocation request from the relay apparatus, the first allocated multicast address that is a multicast address, which is not allocated to any multicast domains, to a multicast domain identified by a combination of the first multicast address and the first tenant identification information; and (g2) a second transmission unit that transmits the first allocated multicast address to at least the relay apparatus that is a transmission source of the allocation request.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Embodiment 1

Figure 1:
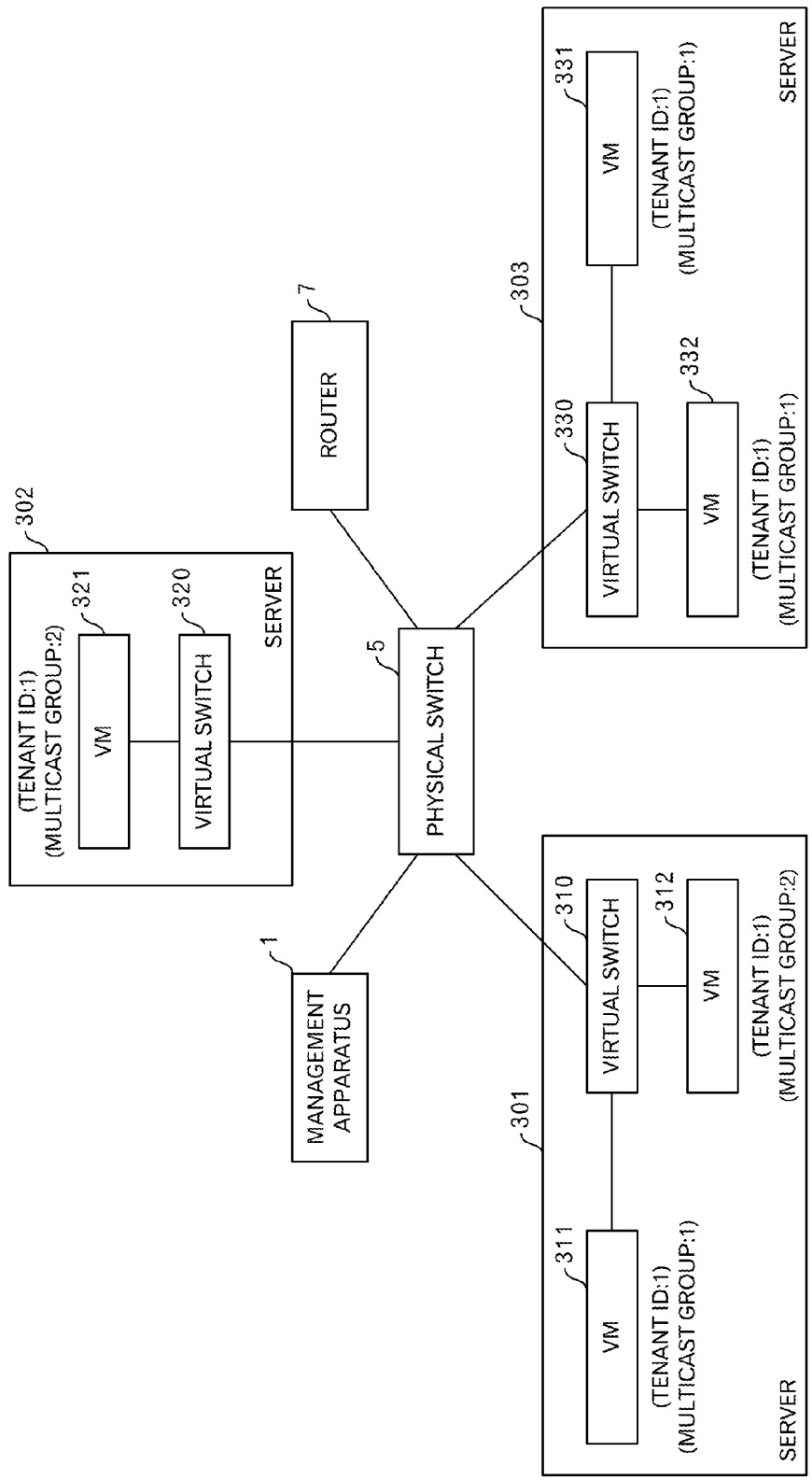
FIG. 1 is a diagram depicting a system outline of embodiments.

FIG. 1 illustrates an outline of a system in this embodiment. Servers 301 to 303, a router 7, and a management apparatus 1 are connected to a physical switch 5 in a data center. The physical switch 5 is, for example, a layer-2 switch. By using hardware resources of the server 301, a virtual switch 310, VM 311 and VM 312 are realized in the server 301. By using hardware resources of the server 302, a virtual switch 320 and VM 321 are realized in the server 302. By using hardware resources of the server 303, a virtual switch 330, VM 331 and VM 332 are realized in the server 303. Each VM is able to perform communication with the VM in the other servers by way of the virtual switch that is realized in the same server.

Here, a tenant ID for the VM 311 is "1", and the VM 311 belongs to a multicast group "1". A tenant ID for the VM 312 is "1", and the VM 312 belongs to a multicast group "2". A tenant ID for the VM 321 is "1", and the VM 321 belongs to the multicast group "2". A tenant ID for the VM 331 is "1", and the VM 331 belongs to the multicast group "1". A tenant ID for the VM 332 is "1", and the VM 332 belongs to the multicast group "1". The multicast MAC address corresponding to the multicast group "1" is "01:00:5e:11:11:11", and the multicast MAC address corresponding to the multicast group "2" is "01:00:5e:22:22:22". In FIG. 1, only VMs whose tenant ID is "1" are illustrated, however, even when VMs whose tenant ID is not "1" are realized in a server, this embodiment can be applied. In other words, this embodiment can be applied to a multi-tenant network.

Figure 2:
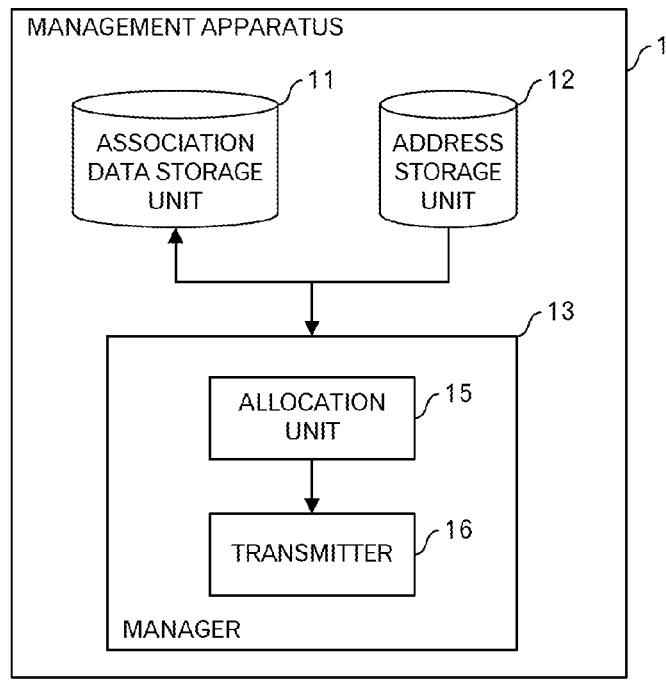
FIG. 2 is a functional block diagram of a management apparatus in a first embodiment.

FIG. 2 illustrates a functional block diagram of the management apparatus 1. The management apparatus 1 includes an association data storage unit 11, an address storage unit 12, and a manager 13 that includes an allocation unit 15 and transmitter 16.

When an allocation request is received, the allocation unit 15 carries out a processing using data that is stored in the address storage unit 12, also outputs processing results to the transmitter 16, and stores the processing results in the association data storage unit 11. The transmitter 16 transmits an address notification that includes the processing results received from the allocation unit 15 to a switch of the transmission source of the allocation request.

Figure 3:
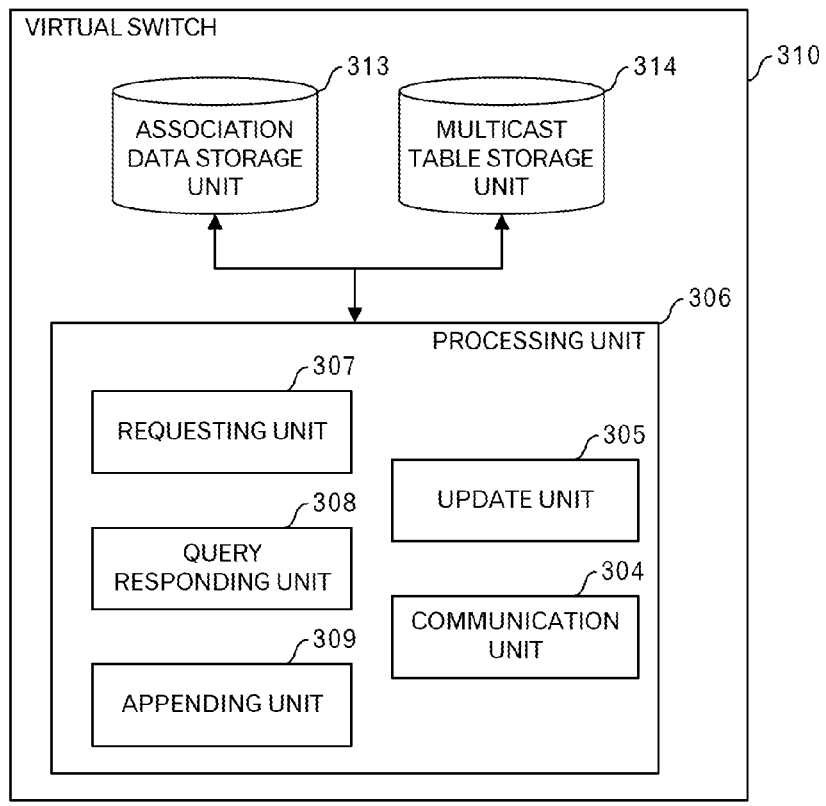
FIG. 3 is a functional block diagram of a virtual switch.

FIG. 3 illustrates a functional block diagram of the virtual switch 310. The virtual switch 310 includes an association data storage unit 313, a multicast table storage unit 314, and a processing unit 306 that includes a requesting unit 307, a query responding unit 308, an appending unit 309, an update unit 305 and a communication unit 304. The functional block diagrams for the virtual switch 320 and virtual switch 330 are the same as the functional block diagram for the virtual switch 310.

The requesting unit 307 carries out a processing for transmitting an allocation request to the management apparatus 1 or the like. When an IGMP Query is received from the router 7, the query responding unit 308 carries out a processing using the association data storage unit 313, and transmits processing results to the router 7. The appending unit 309 adds an expanded header, which includes an outer multicast address that is extracted from the association data storage unit 313, to the received multicast data. The update unit 305 carries out a processing for updating the data that is stored in the association data storage unit 313 and the data that is stored in the multicast table storage unit 314. The communication unit 304 uses the data that is stored in the association data storage unit 313 and the data that is stored in the multicast table storage unit 314 to carry out a processing for transferring multicast data. The outer multicast address will be explained later.

Figures 4, 5, 6, 7:
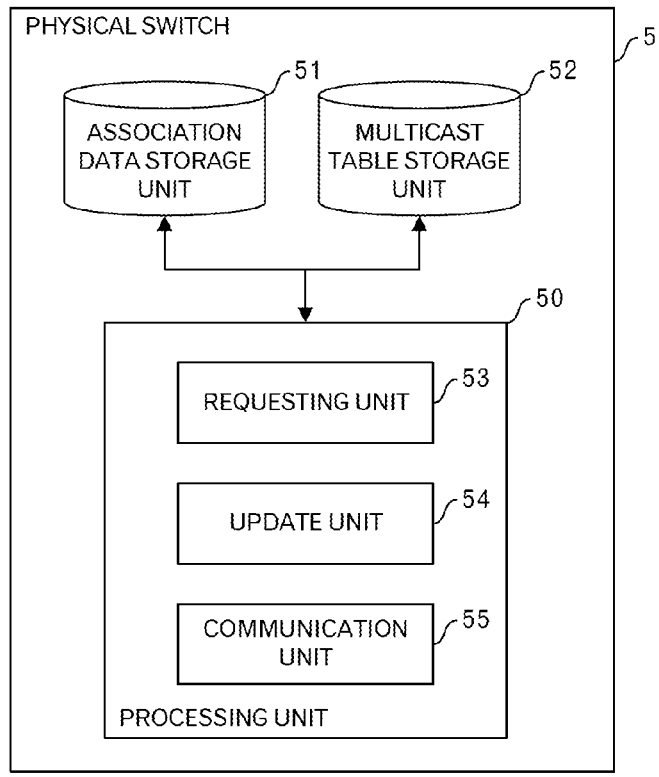
FIG. 4 is a functional block diagram of a physical switch.
FIG. 5 is a diagram depicting an example of data stored in an association data storage unit.
FIG. 6 is a diagram depicting an example of data stored in a multicast table storage unit in the virtual switch.
FIG. 7 is a diagram depicting an example of data stored in a multicast table storage unit in the physical switch.

FIG. 4 illustrates a functional block diagram of the physical switch 5. The physical switch 5 includes an association data storage unit 51, a multicast table storage unit 52 and a processing unit 50 that includes a requesting unit 53, an update unit 54 and a communication unit 55.

The requesting unit 53 carries out a processing for transmitting an allocation request to the management apparatus 1 or the like. The update unit 54 carries out a processing for updating the data stored in the association data storage unit 51 and the data stored in the multicast table storage unit 52. The communication unit 55 uses the data stored in the association data storage unit 51 and the data stored in the multicast table storage unit 52 to carry out a processing for transferring multicast data.

FIG. 5 illustrates an example of association data that is stored in the virtual switches 310 to 330, the association data storage unit 51 of the physical switch 5 and the association data storage unit 11 of the management apparatus 1. In the example in FIG. 5, an outer multicast address is stored in association with a combination of the tenant ID and inner multicast address. The outer multicast address that is in use in the system illustrated in FIG. 1 is registered in the association data storage unit 51 of the physical switch 5 and the association data storage unit 11 of the management apparatus 1. On the other hand, an outer multicast address that is related to the tenant of a VM that is subordinate to that virtual switch is registered in the association data storage unit 313 of the virtual switches 310 to 330.

FIG. 6 illustrates an example of a multicast table that is stored in the multicast table storage unit 314 of the virtual switches 310 to 330. In the example in FIG. 6, a multicast MAC address and a port identifier (port number, for example) are stored. In the column for the multicast MAC address in the multicast table of the virtual switches 310 to 330, an inner multicast address that will be described later is stored.

FIG. 7 illustrates an example of a multicast table that is stored in the multicast table storage unit 52 of the physical switch 5. In the example in FIG. 7, a multicast MAC address and a port identifier (port number, for example) are stored. In the multicast MAC address column in the multicast table of the physical switch 5, an outer multicast address that will be described later is stored.

Figure 8:
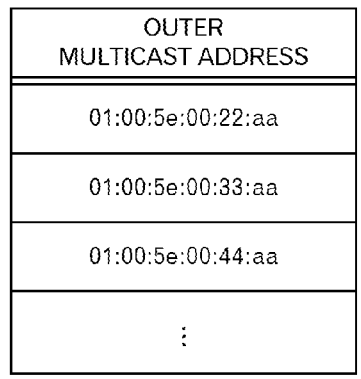
FIG. 8 is a diagram depicting an example of data stored in an address storage unit.

FIG. 8 illustrates data that is stored in the address storage unit 12 of the management apparatus 1. In the example in FIG. 8, outer multicast addresses are stored. The outer multicast addresses that are stored in the address storage unit 12 are multicast addresses that have not been allocated to any multicast domain (also called a multicast tree).

Next, a processing that is performed by the system illustrated in FIG. 1 will be explained using FIG. 9 to FIG. 24. First, a processing executed by the management apparatus 1 for distributing outer multicast addresses to the virtual switches 310 to 330 and the physical switch 5 (in other words, a processing for building a multicast domain) will be explained using FIG. 9 to FIG. 16.

Figure 9:
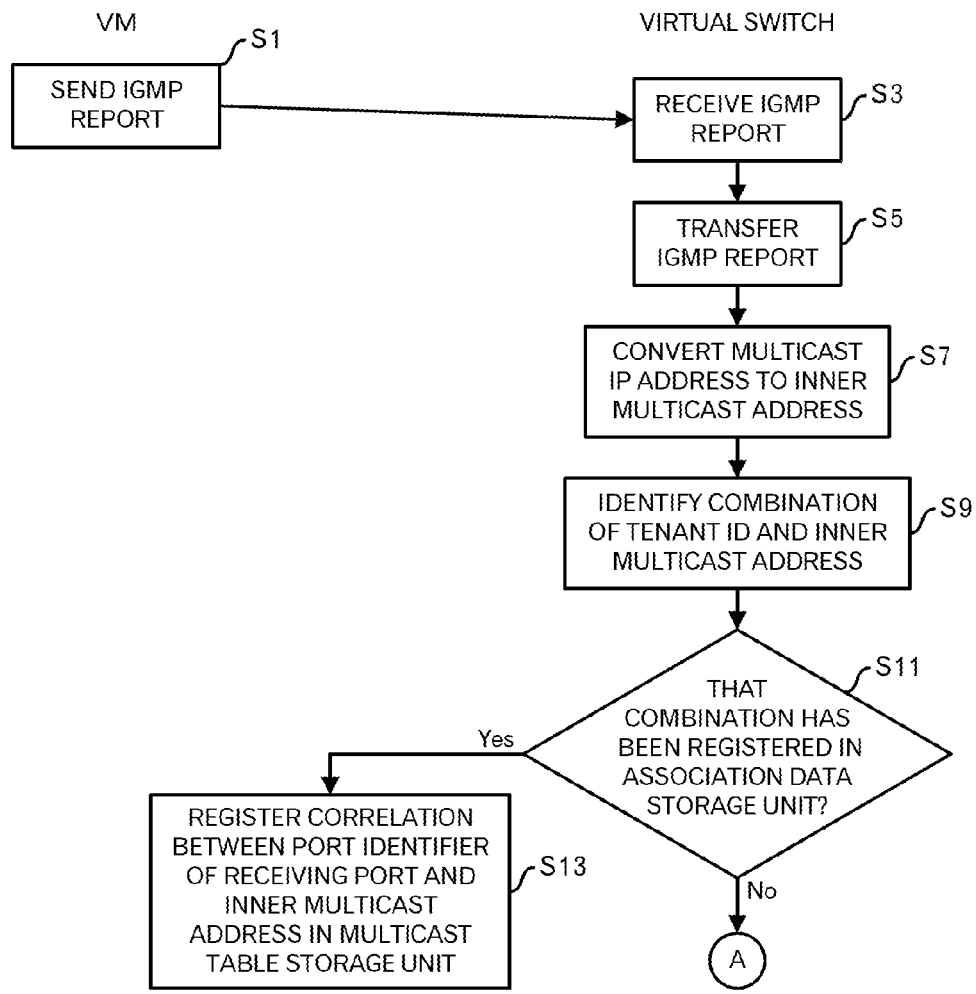
FIG. 9 is a diagram depicting a main processing flow in the first embodiment.

First, the VM 311 that requests to participate in the multicast group "1" transmits an IGMP Membership Report (hereafter, abbreviated as IGMP report) (FIG. 9: step S1). In the example of this embodiment, the VM 311 transmits an IGMP report to the IPv4 (Internet Protocol version 4) multicast IP address "224.17.17.17" as the transmission destination IP address.

The communication unit 304 of the virtual switch 310 receives the IGMP Report from VM 311 (step S3). The communication unit 304 also transfers the received IGMP report to the physical switch 5 (step S5).

Figure 10:
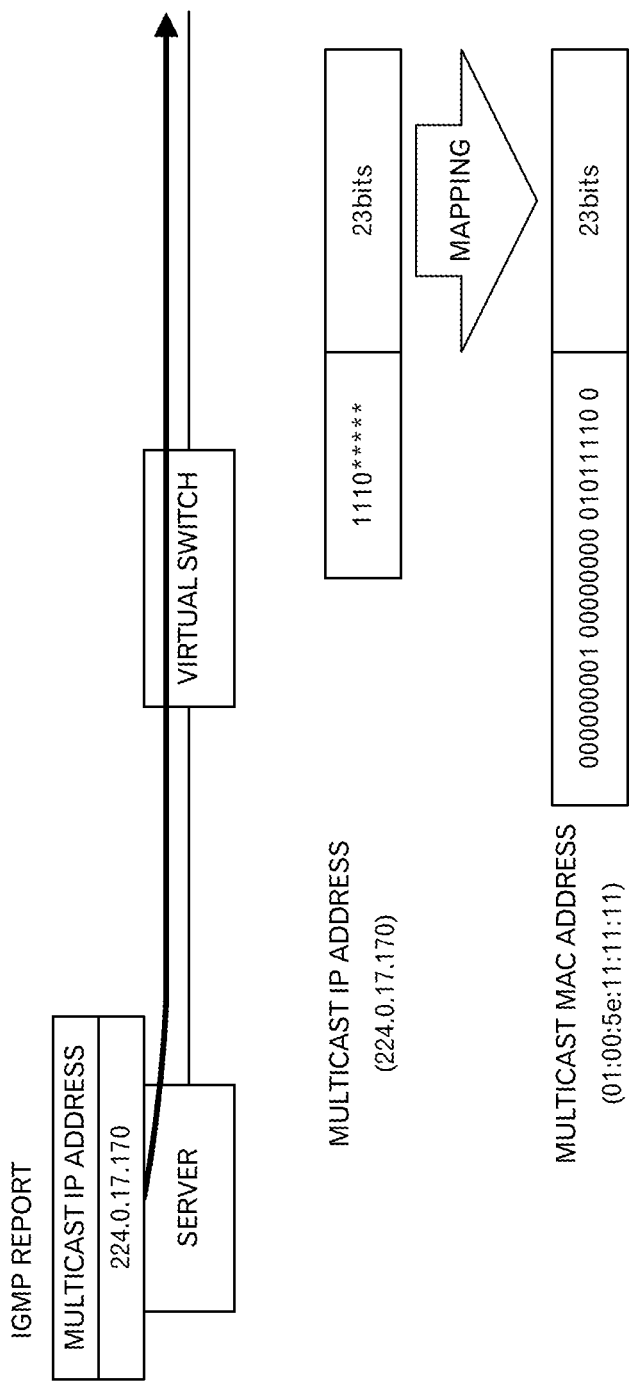
FIG. 10 is a diagram to explain a processing to convert a multicast IP address to a multicast MAC address.

The communication unit 304 converts the multicast IP address included in the payload of the received IGMP Report to a multicast MAC address (step S7). In this embodiment, as illustrated in FIG. 10 for example, 25 predetermined bits are allocated for 25 bits from the top of the multicast MAC address, and the last 23 bits of the multicast IP address are mapped onto the remaining 23 bits. This kind of conversion is well known, so a detailed explanation is omitted here. As a result of the conversion at the step S7, it is assumed that the multicast MAC address "01:00:5e:11:11:11" is obtained. In the following, the multicast MAC address that was obtained at the step S7 will be called an "inner multicast address".

The communication unit 304 identifies a combination of the tenant ID that is included in the received IGMP Report (here, the tenant ID is "1") and the inner multicast address (step S9). Then, the communication unit 304 determines whether or not the identified combination is registered in the association data storage unit 313 (step S11). When the combination has been registered (step S11: YES route), the communication unit 304 outputs the port identifier of the port that received the IGMP Report and the inner multicast address to the update unit 305. The update unit 305 registers correlation between the port identifier of the port that received the IGMP Report and the inner multicast address in the multicast table storage unit 314 (step S13).

On the other hand, when the combination is not registered (step S11: NO route), a processing moves to step S15 in FIG. 11 by way of a terminal A.

Figure 11:
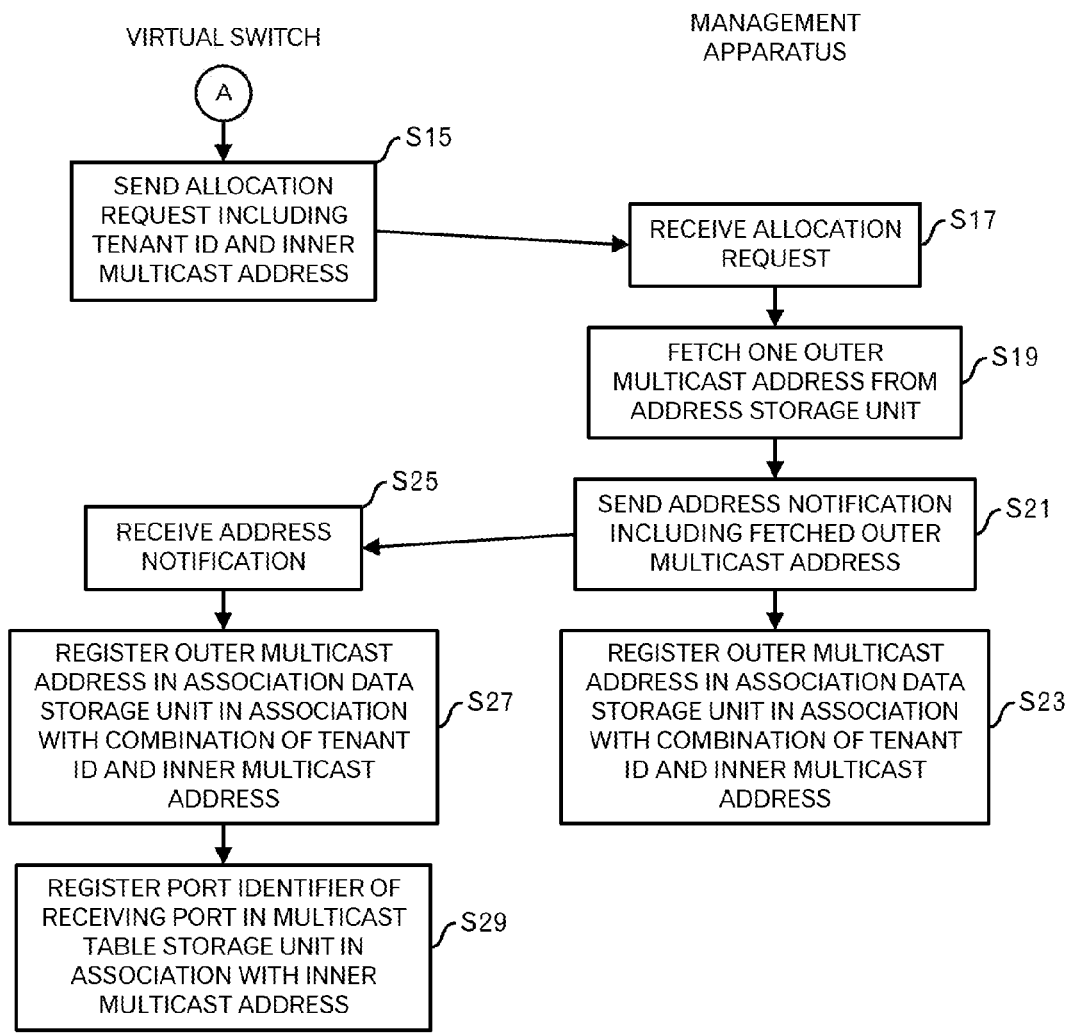
FIG. 11 is a diagram depicting a main processing flow in the first embodiment.
Figure 12:
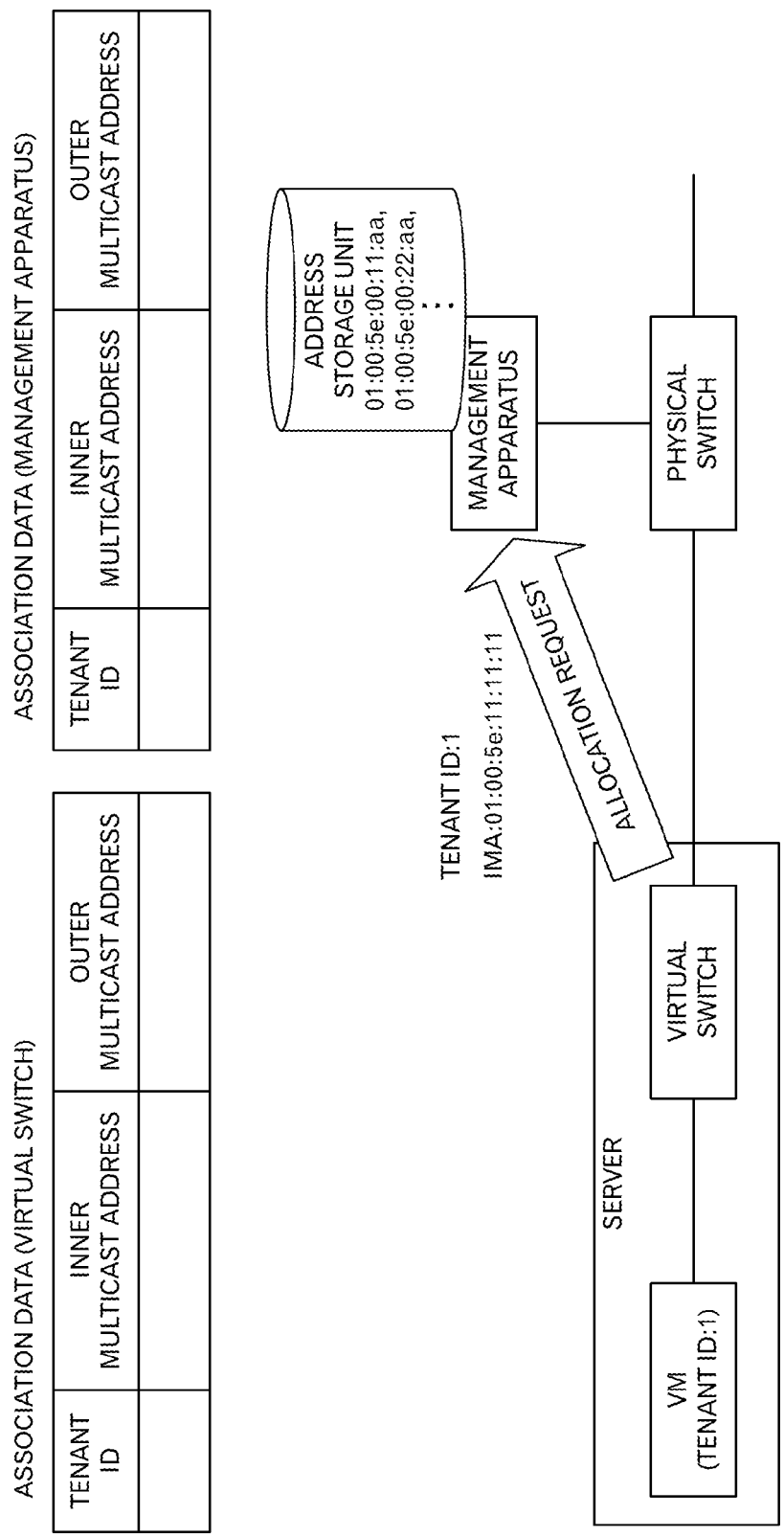
FIG. 12 is a diagram depicting an example of data stored in an association data storage unit in the management apparatus and the virtual switch.

Moving to an explanation of FIG. 11, the communication unit 304 outputs a notification to the requesting unit 307, which represents that the identified combination is not registered in the association data storage unit 313. As a result, the requesting unit 307 transmits an allocation request, which includes the tenant ID and the inner multicast address, to the management apparatus 1 (step S15). FIG. 12 illustrates an example of data that is stored in the association data storage unit 313 of the virtual switch 310 and the data that is stored in the association data storage unit 11 of the management apparatus 1 at the time of the processing of the step S15. At the time of the processing of the step S15, there is no outer multicast address registered in either of the association data storage units. In FIG. 12, the inner multicast address is abbreviated as IMA.

The allocation unit 15 of the management apparatus 1 receives the allocation request from the virtual switch 310 (step S17). When the combination of the tenant ID and the inner multicast address, which are included in the allocation request, is not registered in the association data storage unit 11, the allocation unit 15 fetches one outer multicast address from the address storage unit 12 (step S19). Then, the allocation unit 15 outputs the fetched outer multicast address to the transmitter 16.

Figure 13:
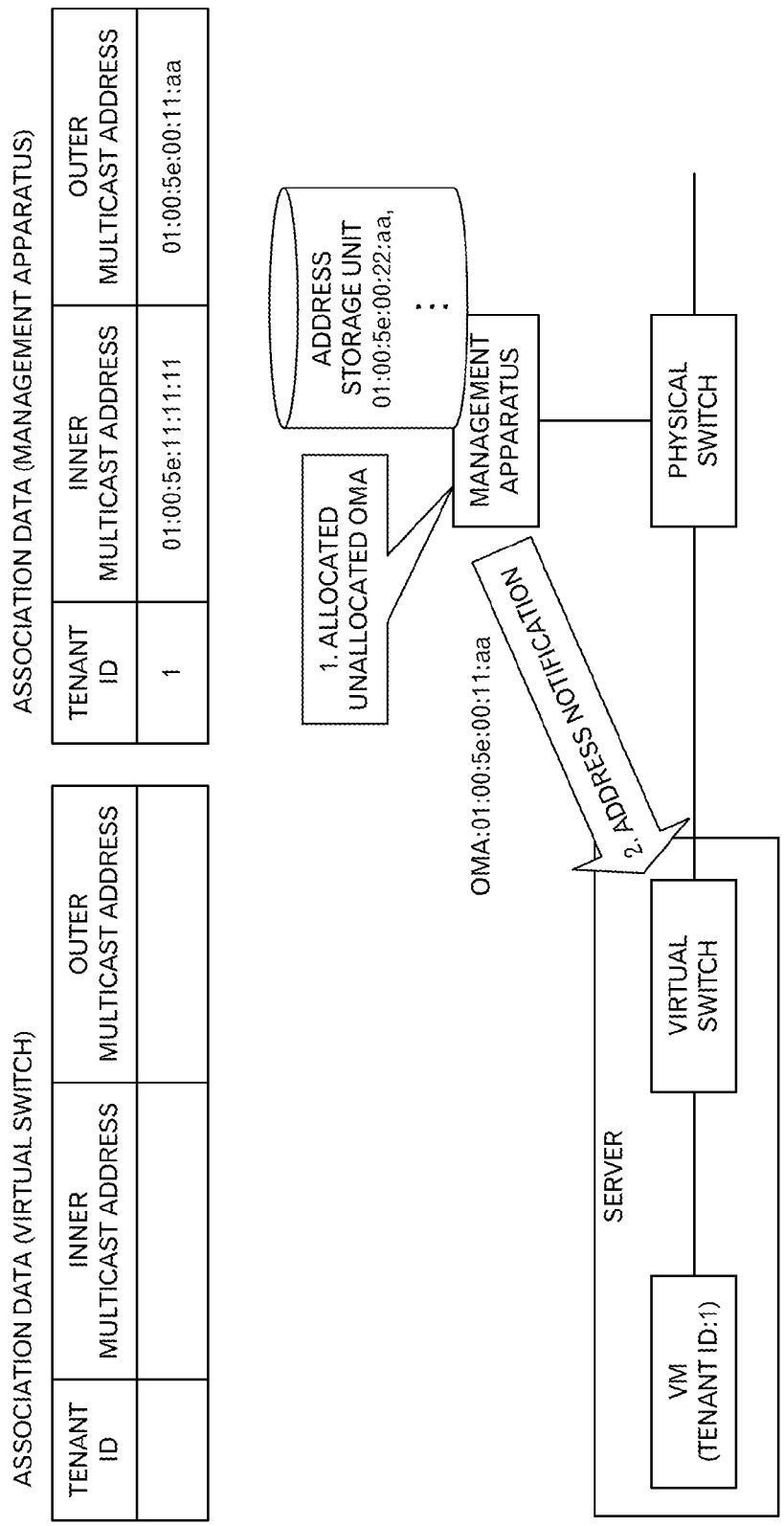
FIG. 13 is a diagram depicting an example of data stored in the association data storage unit in the management apparatus and the virtual switch.

The transmitter 16 transmits an address notification, which includes the outer multicast address, to the virtual switch 310 (step S21). Moreover, the transmitter 16 registers the outer multicast address as correlated with the combination of the tenant ID and the inner multicast address, which are included in the allocation request, in the association data storage unit 11 (step S23). FIG. 13 illustrates an example of data that is stored in the association data storage unit 313 of the virtual switch 310 and the data that is stored in the association data storage unit 11 of the management apparatus 1 at the time of the processing of the step S23. At the time of the processing of the step S23, the outer multicast address is registered in the association data storage unit 11 of the management apparatus 1. In FIG. 13, the outer multicast address is abbreviated as OMA.

Figure 14:
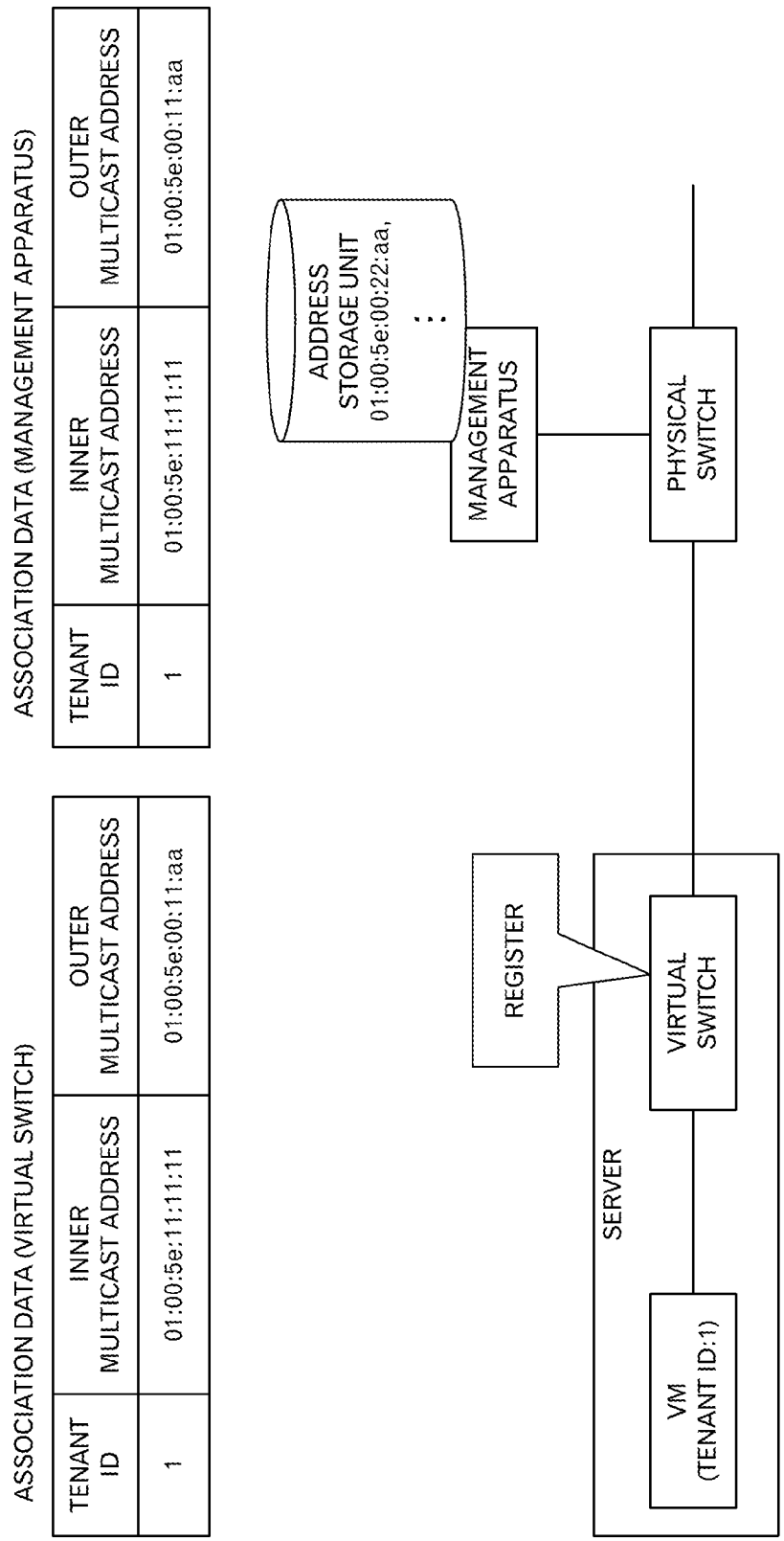
FIG. 14 is a diagram depicting an example of data stored in the association data storage unit in the management apparatus and the virtual switch.

The communication unit 304 of the virtual switch 310 receives the address notification (step S25), and outputs the outer multicast address that is included in the address notification to the update unit 305. The update unit 305 registers the outer multicast address in the association data storage unit 313 as correlated with the combination of the tenant ID and the inner multicast address, which are included in the allocation request (step S27). The update unit 305 also registers the port identifier of the port that received the IGMP Report in the multicast table storage unit 314 as correlated with the inner multicast address (step S29). FIG. 14 illustrates an example of data that is stored in the association data storage unit 313 of the virtual switch 310 and the data that is stored in the association data storage unit 11 of the management apparatus 1 at the time of the processing of the step S29. At the time of the processing of the step S29, the outer multicast address is registered in each association data storage unit.

Figure 15:
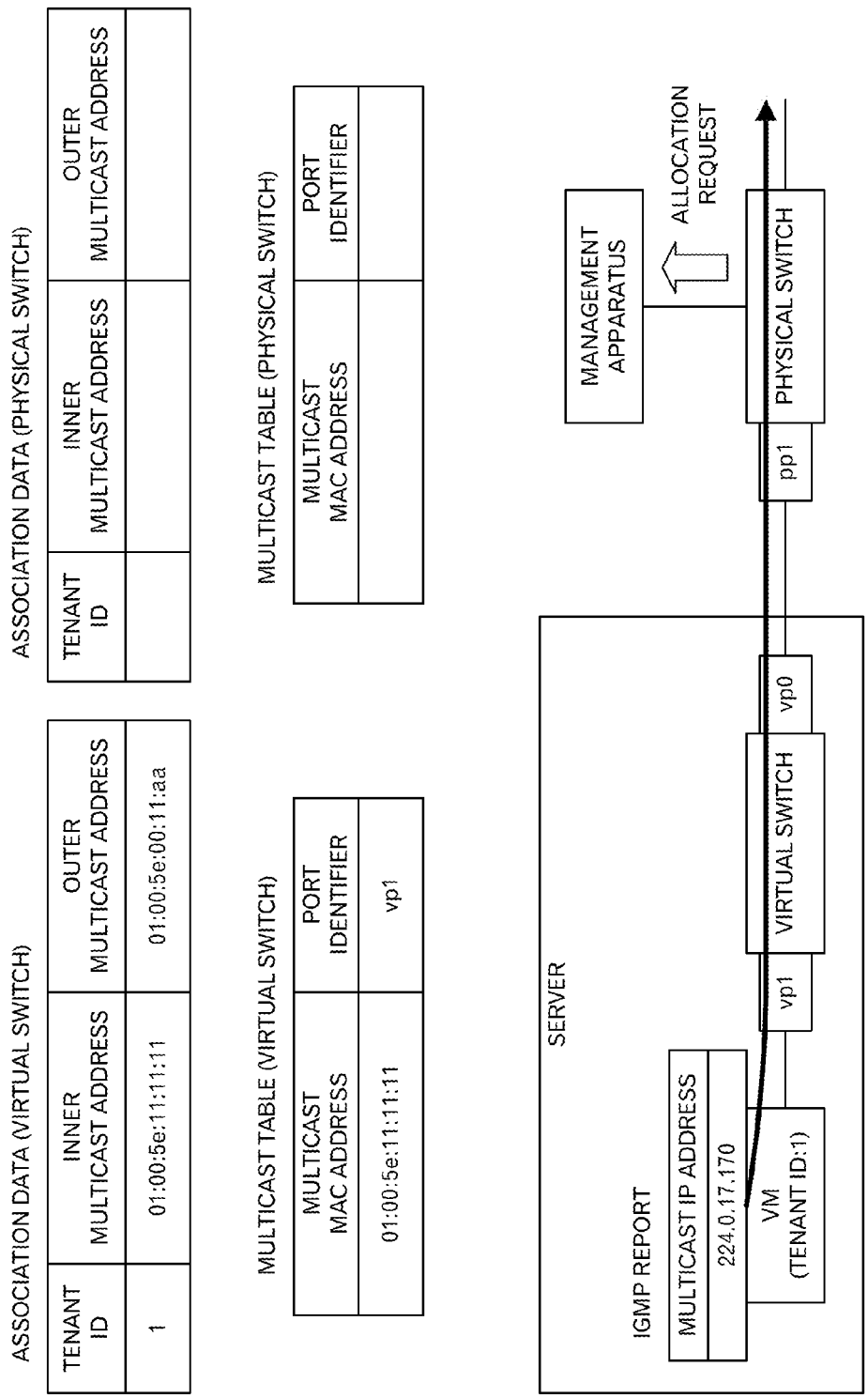
FIG. 15 is a diagram depicting an example of data stored in an association data storage unit of the physical switch.
Figure 16:
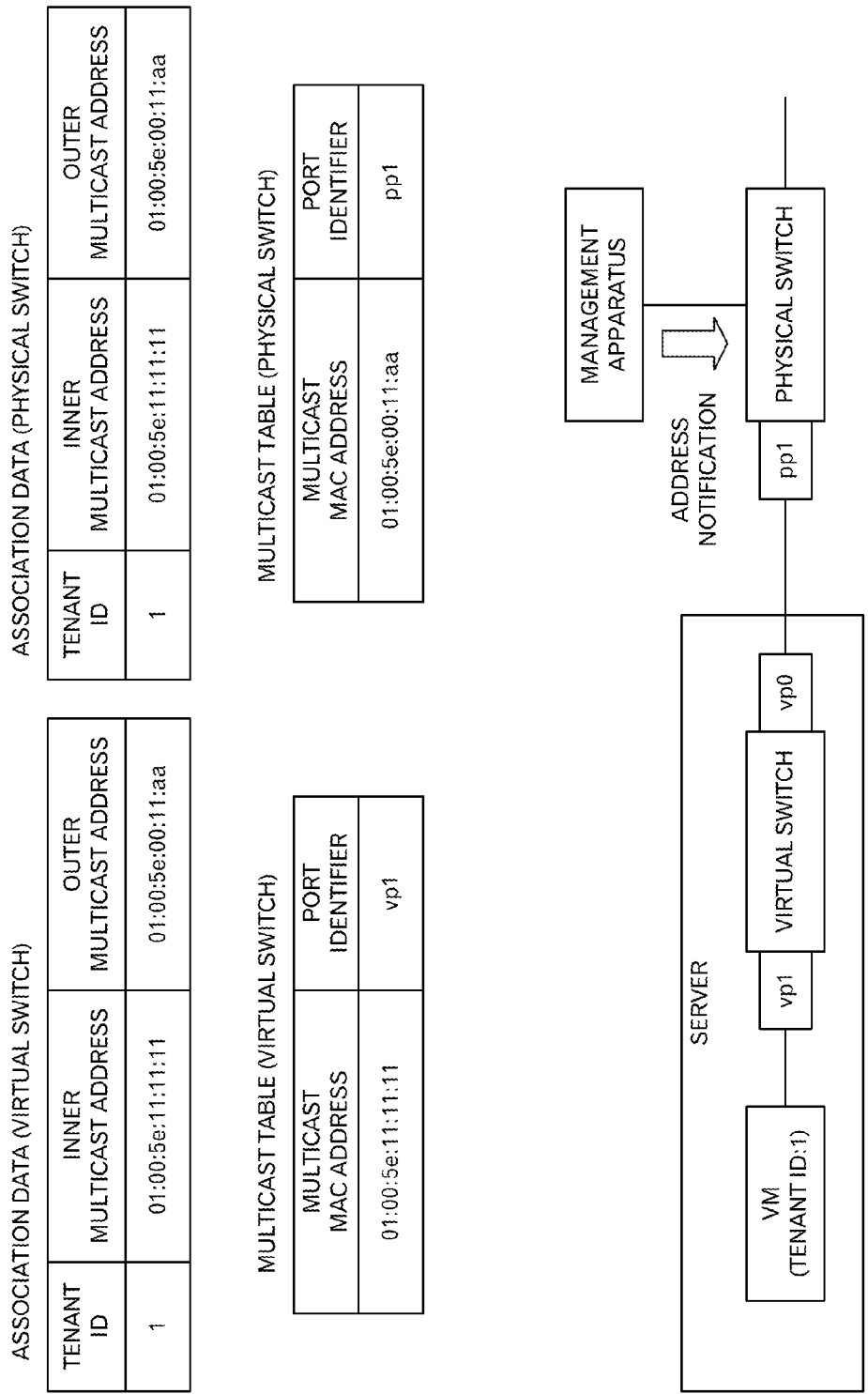
FIG. 16 is a diagram depicting an example of data stored in the association data storage unit of the physical switch.

The processing that is performed in the physical switch 5, which received the multicast data that was transmitted by the VM 311 by way of the virtual switch 310, is basically the same as the processing that is performed by the virtual switch 310. In other words, the physical switch 5, as illustrated in FIG. 15, transmits an allocation request to the management apparatus 1 after the IGMP Report is received. At the time of this processing, data is not stored in either the association data storage unit 51 or the multicast table storage unit 52 of the physical switch 5. Then, as illustrated in FIG. 16, when an address notification is received from the management apparatus 1, the physical switch 5 registers data in the association data storage unit 51 and the multicast table storage unit 52.

However, the processing that is performed by the virtual switch 310 differs in the following points. In other words, at the step S13, the update unit 54 of the physical switch 5 registers the port identifier of the port that received the IGMP Report in the multicast table storage unit 52 in association with the outer multicast address. Also at the step S29, the update unit 54 of the physical switch 5 registers the port identifier of the port that received the IGMP Report in multicast table storage unit 52 in association with the outer multicast address. As a result, it becomes possible for the physical switch 5 as well to suitably transfer multicast data by using the outer multicast address.

As was described above, an outer multicast address is allocated for each combination of the tenant ID and the inner multicast address, and distributed to the virtual switches and physical switch. As a result, suitable multicast domains are automatically built (in other words, transfer paths for multicast data are suitably set) even though an administrator does not set each switch. Furthermore, the management apparatus 1 centrally manages outer multicast addresses, so it is possible to prevent from allocating the same outer multicast address to plural multicast domains.

Next, FIG. 17 to FIG. 21 will be used to explain an actual processing by the virtual switches 310 to 330 and physical switch 5 to transfer multicast data. However, it is assumed that, by performing the processing described above, data that is used in transferring is stored in the association data storage units and multicast table storage units in the physical switch 5 and virtual switches 310 to 330.

Figure 17:
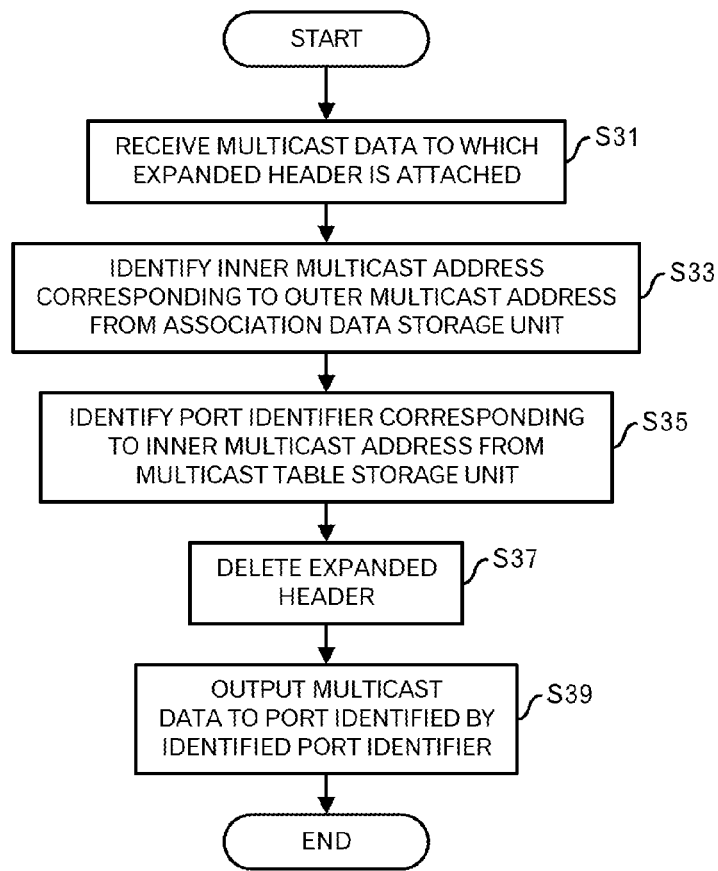
FIG. 17 is a diagram depicting a processing flow of a processing when the virtual switch receives multicast data to which an expanded header is attached.

First, the processing that is performed when the virtual switch 310 receives multicast data to which an expanded header is attached will be explained using FIG. 17. The communication unit 304 of the virtual switch 310 receives multicast data to which an expanded header is attached from the physical switch 5 (FIG. 17: step S31).

The communication unit 304 identifies the inner multicast address that corresponds to the outer multicast address that is included in the expanded header from the association data storage unit 313 (step S33). Moreover, the communication unit 304 identifies the port identifier that corresponds to the inner multicast address that was identified at the step S33 from the multicast table storage unit 314 (step S35).

Then, the communication unit 304 deletes the expanded header of the received multicast data (step S37). Moreover, the communication unit 304 outputs the multicast data from which the expanded header has been deleted to the port that is identified by the port identifier that was identified at the step S35 (step S39). The processing then ends.

By performing the aforementioned processing, it becomes possible to transfer the multicast data to VMs.

Figure 18:
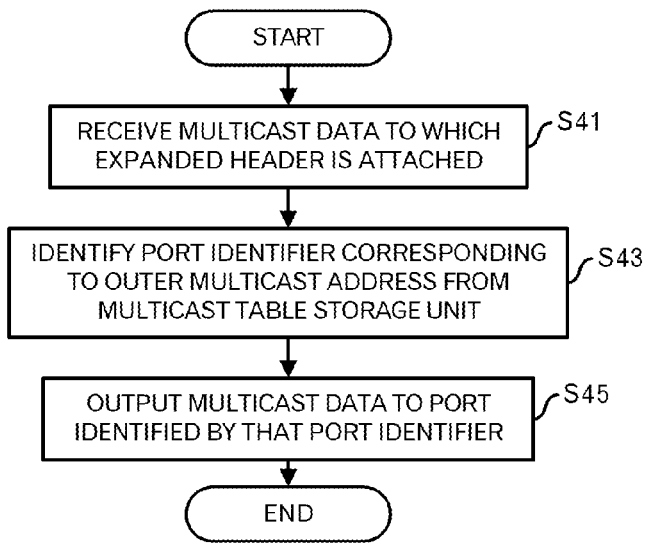
FIG. 18 is a diagram depicting a processing flow of a processing when the physical switch receives the multicast data to which the expanded header is attached.

A processing that is performed when the physical switch 5 received multicast data to which an expanded header is attached will be explained using FIG. 18. First, the communication unit 55 of the physical switch 5 receives multicast data to which an expanded header is attached from one of the virtual switches 310 to 330 (FIG. 18: step S41).

The communication unit 55 identifies, from the multicast table storage unit 52, the port identifier of the port that corresponds to the outer multicast address that is included in the expanded header (step S43). In addition, the communication unit 55 outputs the multicast data to the port that is identified by the port identifier that was identified at the step S43 (step S45). The processing then ends.

By performing the processing such as described above, the physical switch 5 is able to transfer the multicast data to which an expanded header is attached to a suitable virtual switch.

Figure 19:
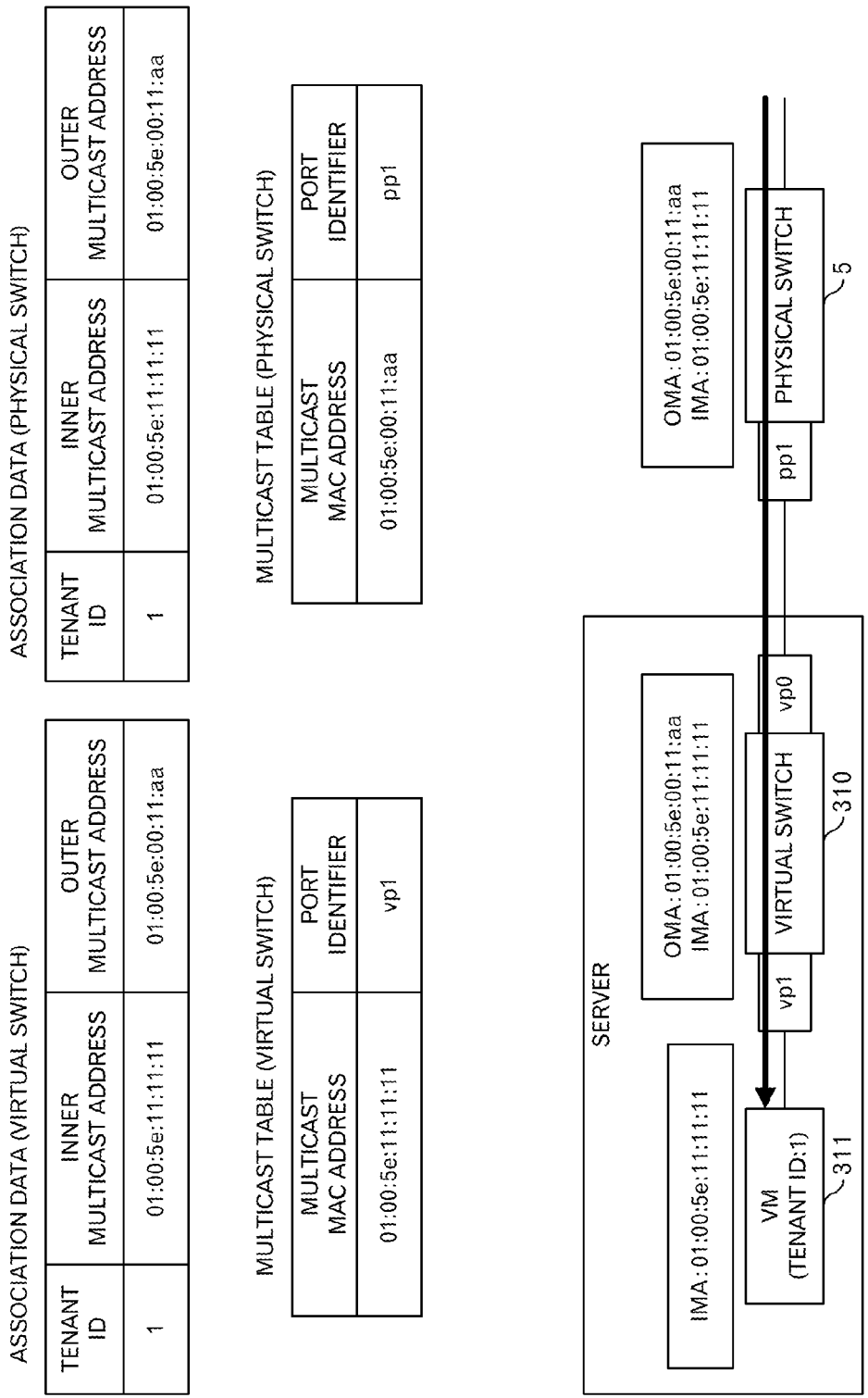
FIG. 19 is a diagram to explain transfer of the multicast data.

Transfer of the multicast data will be explained in further detail using FIG. 19. FIG. 19 illustrates an outline of transferring the multicast data that was transmitted by the physical switch 5 up to the VM 311 by way of the virtual switch 310. It is presumed that data such as illustrated on the upper right side is registered in the association data storage unit 51 and multicast table storage unit 52 in the physical switch 5. It is also presumed that data such as illustrated on the upper left side is registered in the association data storage unit 313 and the multicast table storage unit 314 in the virtual switch 310.

In this case, when the physical switch 5 receives multicast data to which an expanded header is attached, the physical switch 5 identifies the port identifier that corresponds to the outer multicast address "01:00:5e:00:11:aa" that is included in the expanded header from the multicast table storage unit 52. Then, the physical switch 5 outputs the multicast data to the port that is identified by the identified port identifier "pp1".

When the virtual switch 310 receives the multicast data from the physical switch 5, the virtual switch 310 identifies the inner multicast address "01:00:5e:11:11:11" that corresponds to the outer multicast address "01:00:5e:00:11:aa" that is included in the expanded header from the association data storage unit 313. Then, the virtual switch 310 identifies the port identifier that corresponds to the identified inner multicast address from the multicast table storage unit 314. The virtual switch 310 then outputs the multicast data from which the expanded header has been deleted to a port that is identified by the port identifier "vp1" that was identified. As a result, the VM 311 is able to receive the multicast data to which an expanded header is not attached.

The processing that is performed after the virtual switch 310 receives multicast data to which an expanded header is not attached will be explained using FIG. 20.

Figure 20:
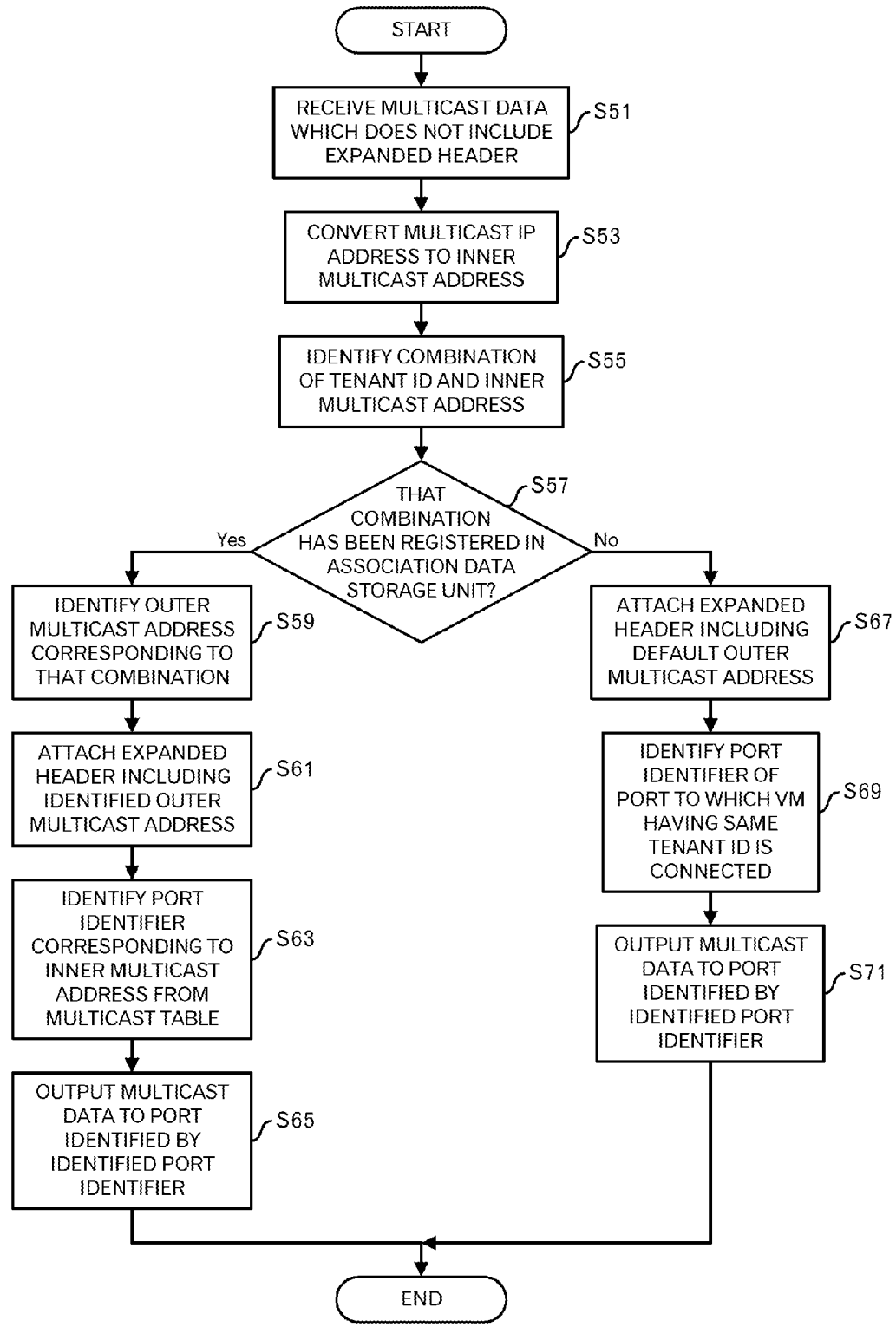
FIG. 20 is a diagram depicting a processing flow of a processing when the virtual switch receives multicast data to which an expanded header is not attached.

First, the communication unit 304 of the virtual switch 310 receives multicast data that does not include an expanded header from the VM 311 (FIG. 20: step S51). The communication unit 304 converts the multicast IP address that is included in the received multicast data to a multicast MAC address (step S53). This conversion is as was described in the explanation of the step S7. In the following, the multicast MAC address that was obtained at the step S53 is called the inner multicast address.

The communication unit 304 identifies a combination of the tenant ID that is included in the received multicast data (here, this is tenant ID "1") and the inner multicast address (step S55).

The communication unit 304 then determines whether or not the identified combination is registered in the association data storage unit 313 (step S57). When the combination is registered (step S57: YES route), the communication unit 304 identifies the outer multicast address that corresponds to that combination from the association data storage unit 313 (step S59). Then, the communication unit 304 outputs the identified outer multicast address and multicast data to the appending unit 309.

The appending unit 309 attaches an expanded header that includes the outer multicast address to the multicast data (step S61). Moreover, the appending unit 309 outputs the multicast data with the expanded header to the communication unit 304.

The communication unit 304 identifies the port identifier that corresponds to the inner multicast address that was obtained at the step S53 from the multicast table storage unit 314 (step S63). The communication unit 304 then outputs the multicast data to which the expanded header is attached to the port that is identified by the identified port identifier (step S65).

On the other hand, at the step S57, when the combination is not registered (step S57: NO route), the communication unit 304 outputs the multicast data to the appending unit 309. The appending unit 309 attaches an expanded header that includes a default outer multicast address to the multicast data (step S67). The appending unit 309 outputs the multicast data with the expanded header to the communication unit 304. The default outer multicast address is an outer multicast address for broadcasting the multicast data to VMs that have the same tenant ID.

The communication unit 304 identifies the port identifiers of the ports to which VMs having the same tenant ID as the tenant ID that is included in the multicast data are connected (step S69). At the step S69, the port identifier is identified using a table (not illustrated in the figure) that correlates the tenant IDs with port identifiers. The communication unit 304 then outputs the multicast data to which an expanded header is attached to the port that is identified by the identified port identifier (step S71). The processing then ends.

By performing the aforementioned processing, the VM 311 is able to transmit multicast data to the VMs that are supposed to receive the multicast data.

Figure 21:
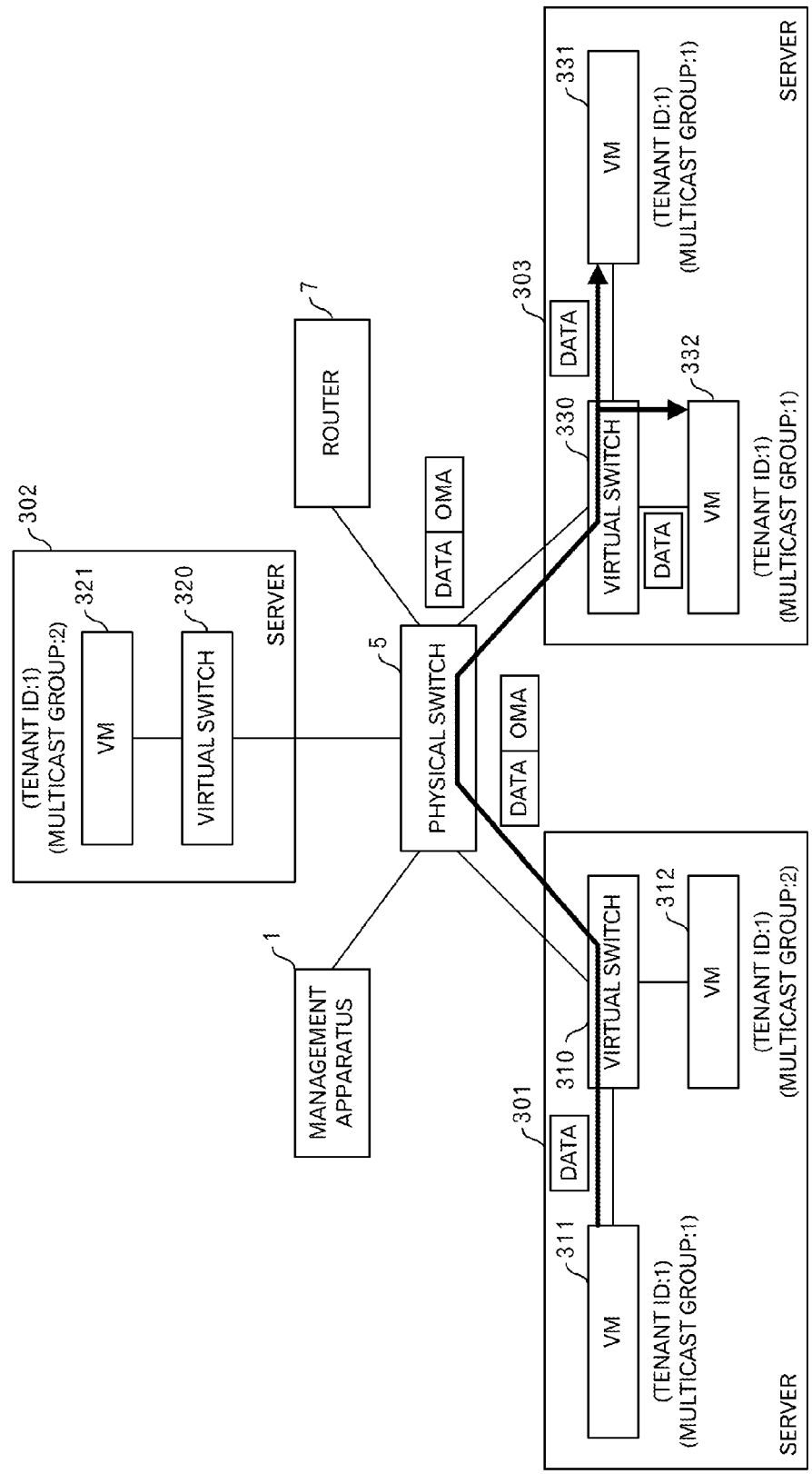
FIG. 21 is a diagram to explain the transfer of the multicast data.

As was explained using FIG. 17 to FIG. 20, when the virtual switches 310 to 330 and physical switch 5 transfer the multicast data, it is possible in the system illustrated in FIG. 1 to transfer multicast data as illustrated in FIG. 21. In other words, first, an expanded header is added to the multicast data that VM 311 transmitted to the multicast group 1, by the virtual switch 310. The virtual switch 310 transfers the multicast data to which an expanded header is attached to the physical switch 5, and the physical switch 5 transfers the multicast data to which an expanded header is attached to the virtual switch 330. The virtual switch 330 deletes the expanded header from the multicast data and transfers that multicast data to the VM 331 and VM 332.

When a technique that simply allocates a multicast address to each tenant ID is applied to the system illustrated in FIG. 1, multicast data that is transmitted by the VM 311 is received not only by the VM 331 and VM 332, but also by the VM 312 and VM 321. However, according to this embodiment, such a case does not occur.

Figure 23:
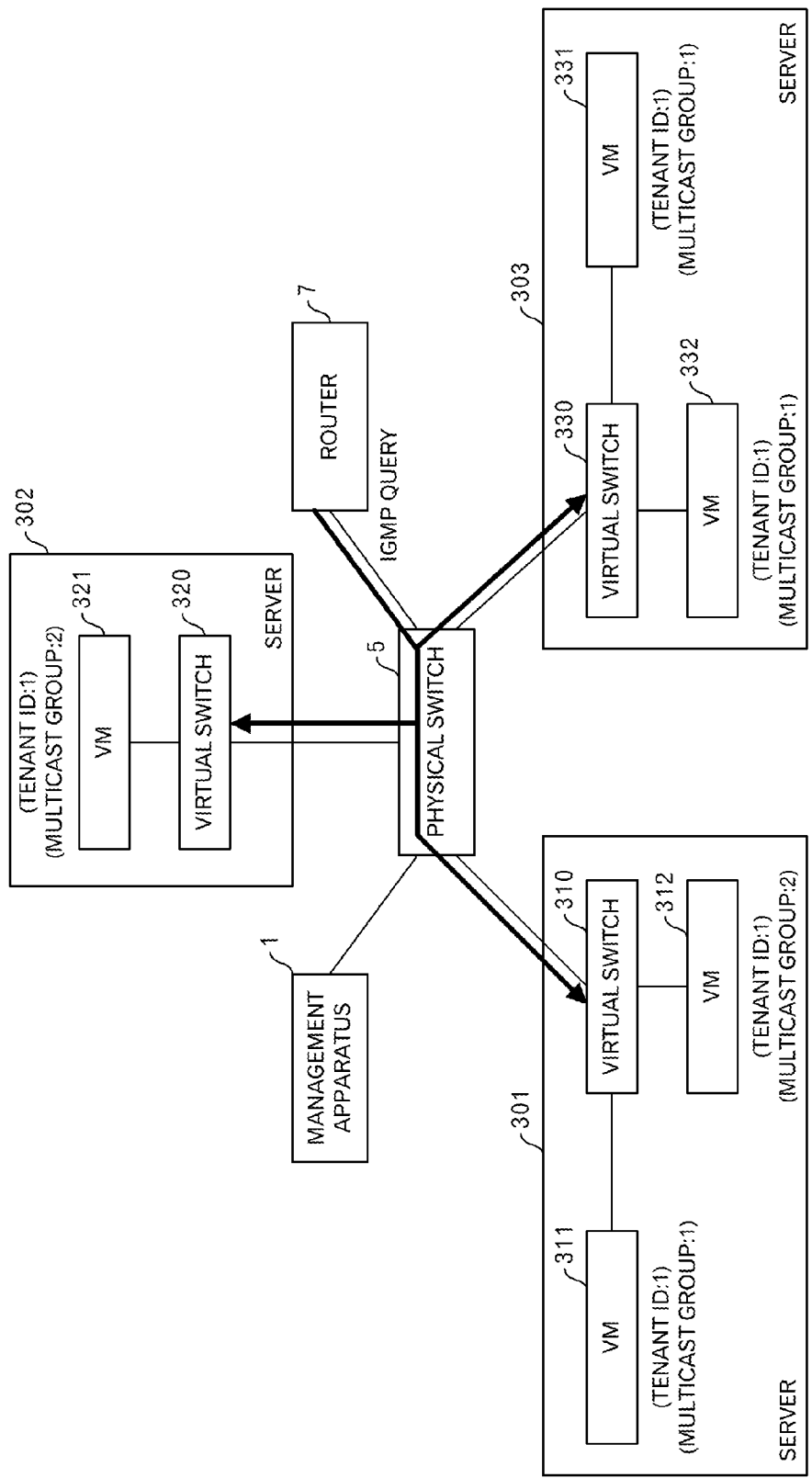
FIG. 23 is a diagram to explain the IGMP Query transmitted by a router.
Figure 24:
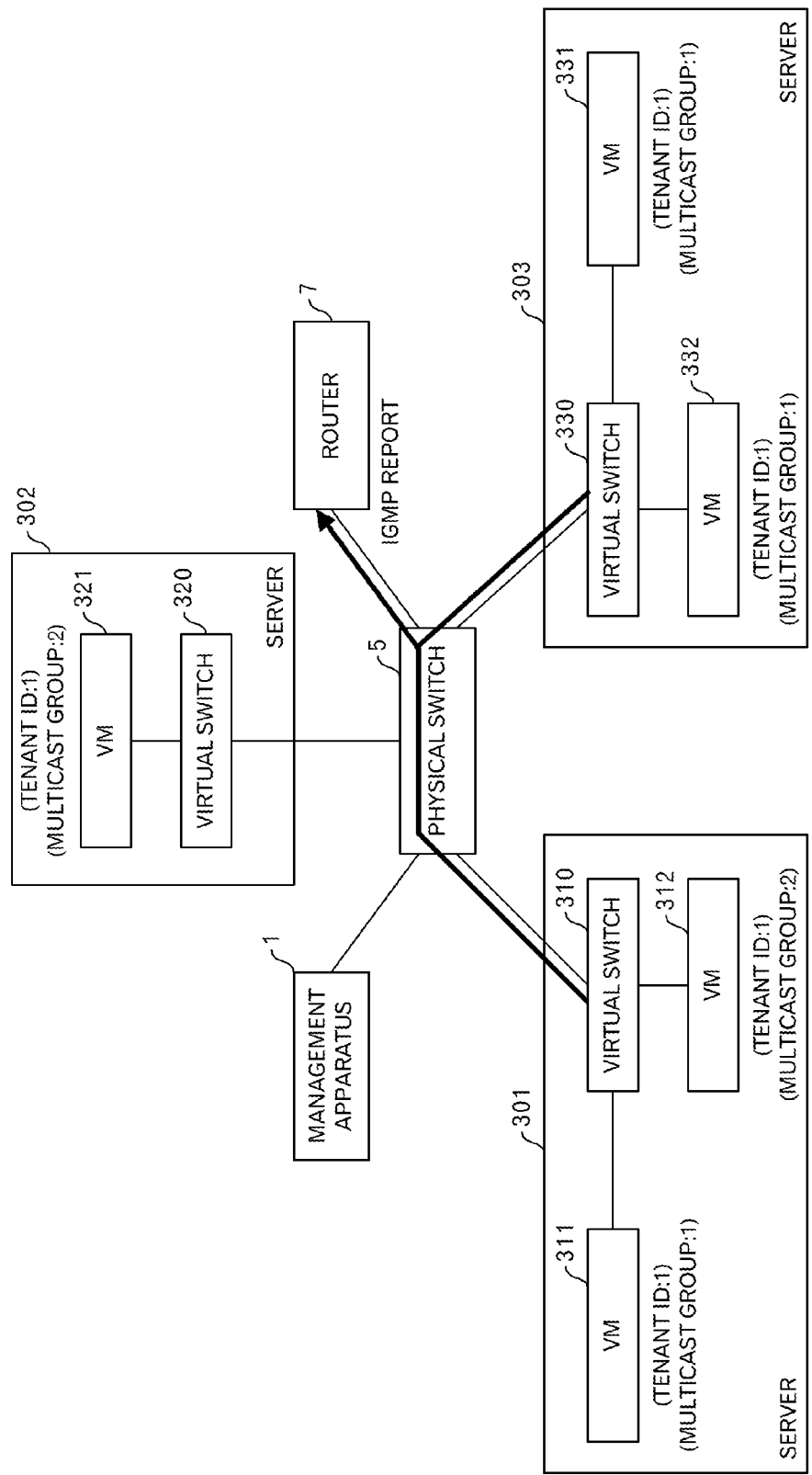
FIG. 24 is a diagram to explain an IGMP Report transmitted by the virtual switch on behalf of VM.

Next, a processing that the virtual switches 310 to 330 transmit an IGMP Report for an IGMP Query from the router 7 on behalf of the VM will be explained using FIG. 22 to FIG. 24. Here, a processing executed by the virtual switch 310 will be explained as an example.

Figure 22:
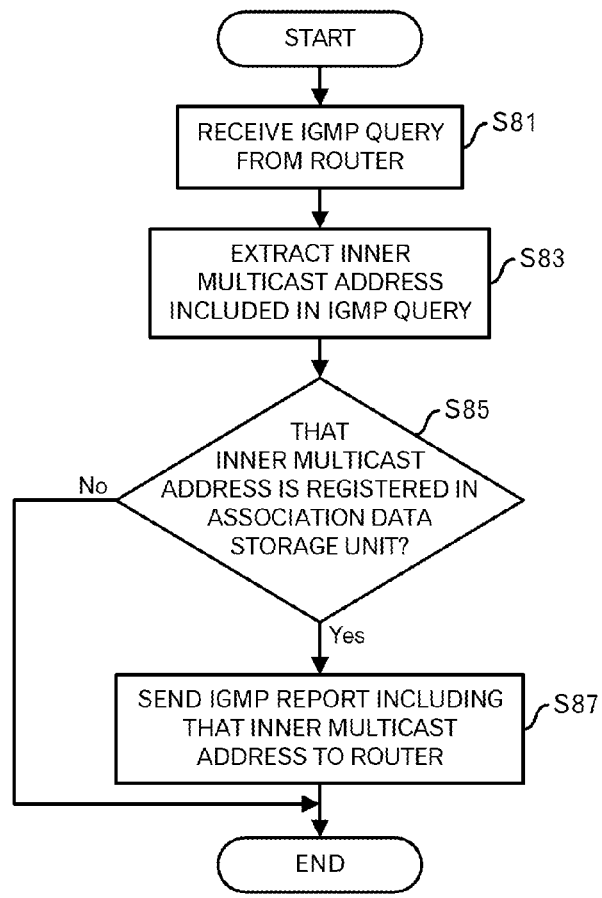
FIG. 22 is a diagram depicting a processing flow of a processing when the virtual switch receives an IGMP Query.

First, the query responding unit 308 of the virtual switch 310 receives an IGMP Query that includes the inner multicast address "01:00:5e:11:11:11" from the router 7 (FIG. 22: step S81). In this example of the embodiment, as illustrated in FIG. 23, the physical switch 5 receives the IGMP Query that was transmitted by the router 7, and the physical switch 5 transfers that IGMP Query to the virtual switches 310 to 330.

The query responding unit 308 extracts the inner multicast address that is included in the IGMP Query (step S83). Then, the query responding unit 308 determines whether or not the extracted inner multicast address is registered in the association data storage unit 313 (step S85).

When the inner multicast address is not registered (step S85: NO route), there is no VM participating in the multicast group that corresponds to the inner multicast address "01:00:5e:11:11:11" under the virtual switch 310. Therefore, the processing ends.

On the other hand, when the inner multicast address is registered (step S85: YES route), there is a VM participating in the multicast group that corresponds to the inner multicast address "01:00:5e:11:11:11" under the virtual switch 310. Therefore, the query responding unit 308 generates an IGMP Report that includes the inner multicast address "01:00:5e:11:11:11", and transmits that IGMP Report to the router 7 (step S87). Then, the processing ends.

By performing the processing as described above, as illustrated in FIG. 24, it becomes possible for a virtual switch having a subordinate VM that participates in the multicast group that corresponds to the inner multicast address "01:00:5e:11:11:11" to transmit an IGMP Report. As a result, the processing by the virtual switch to transfer an IGMP Query to a VM becomes unnecessary, and the processing by the VM that is subordinate to the virtual switch to transmit an IGMP Report to the virtual switch becomes unnecessary. Therefore, it becomes possible to reduce the load on the server.

Embodiment 2

Next, a second embodiment will be explained. In this second embodiment, when the management apparatus 1 fetches an outer multicast address from the address storage unit 12 and transmits an address notification, the management apparatus 1 transmits the address notification not only to the virtual switch or physical switch, which is the transmission source of the allocation request, but also to other related virtual switches.

Figure 25:
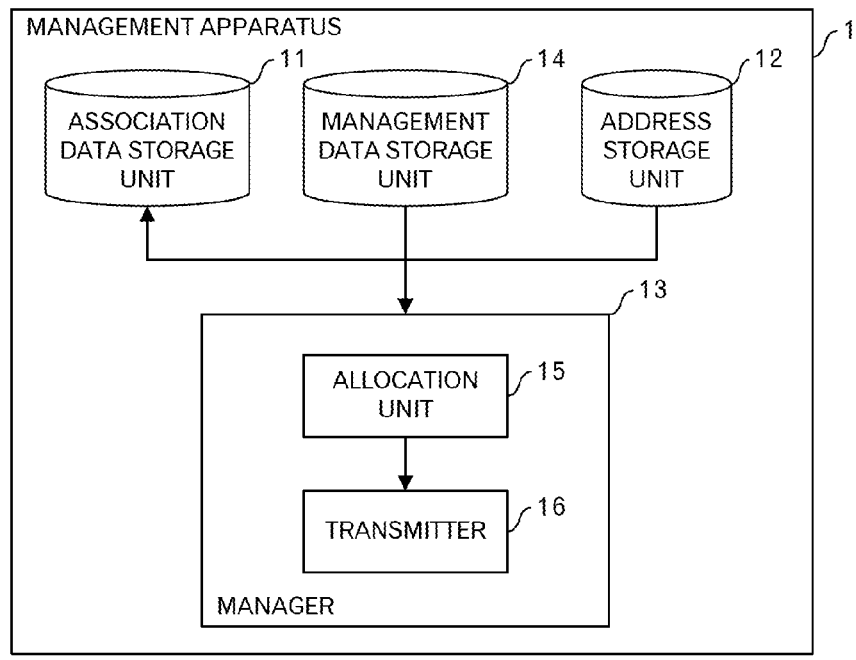
FIG. 25 is a functional block diagram of an management apparatus in a second embodiment.

FIG. 25 illustrates a functional block diagram of the management apparatus 1 in this second embodiment. The management apparatus 1 includes an association data storage unit 11, an address storage unit 12, a management data storage unit 14, and a manager 13 that includes an allocation unit 15 and a transmitter 16. The association data storage unit 11, address storage unit 12, manager 13, allocation unit 15 and transmitter 16 are the same as those in the first embodiment, so the explanation is omitted.

Figures 26, 28:
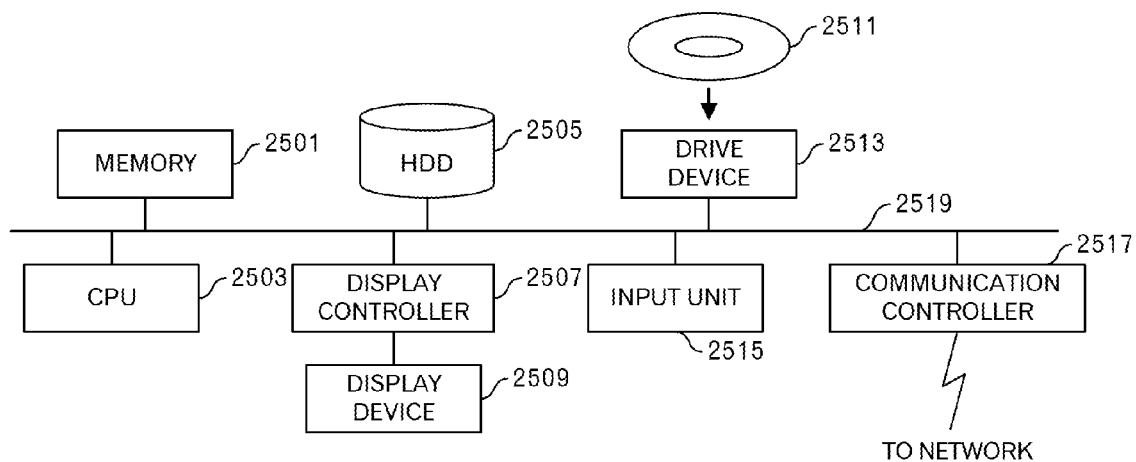
FIG. 26 is a diagram depicting an example of data stored in a management data storage unit.
FIG. 28 is a functional block diagram of a computer.

FIG. 26 illustrates an example of data that is stored in the management data storage unit 14. In the example in FIG. 26, tenant IDs, and MAC addresses of virtual switches are stored.

Figure 27:
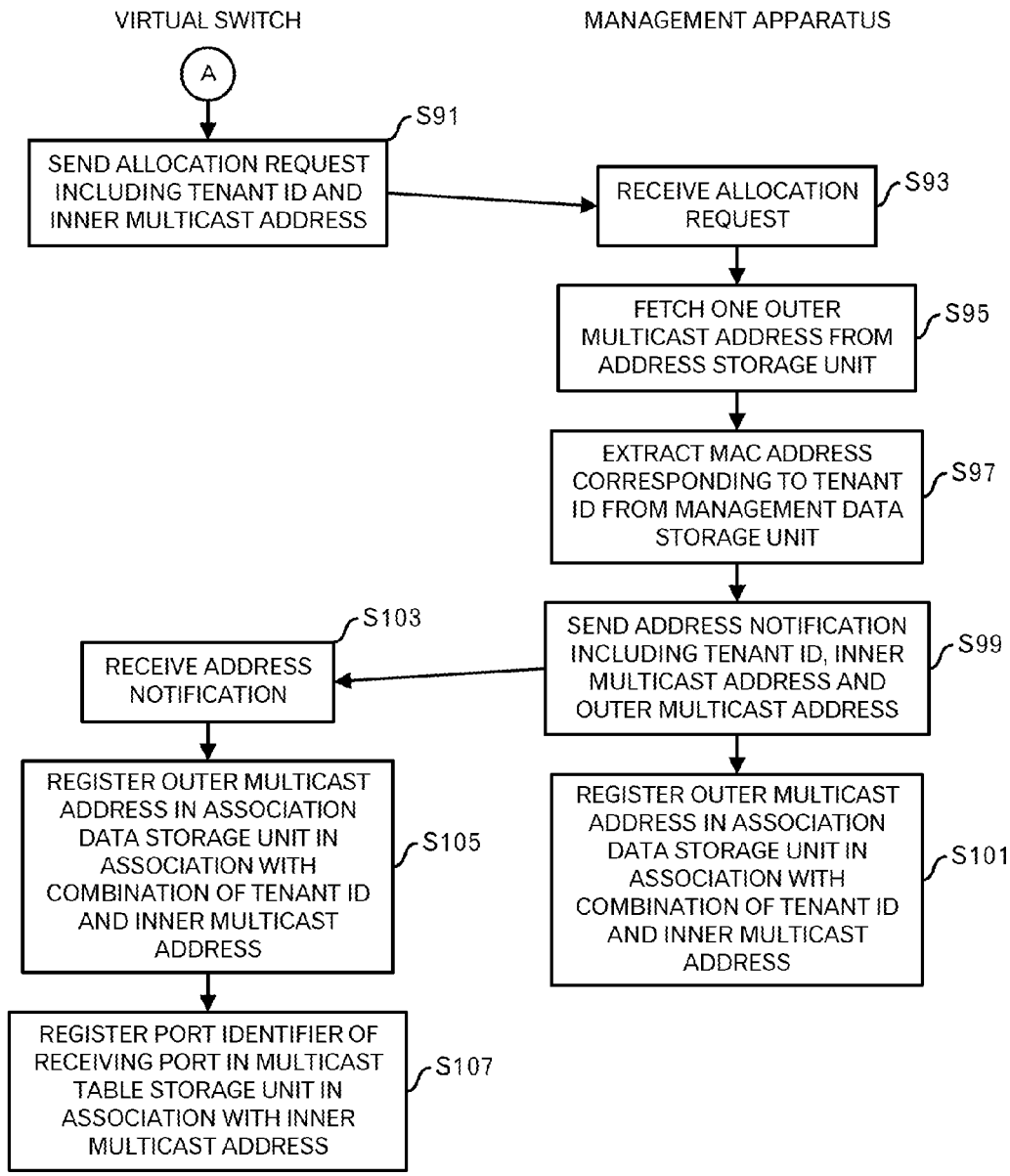
FIG. 27 is a diagram depicting a main processing flow in the second embodiment.

Operations of the management apparatus 1 and virtual switches 310 to 330 in the second embodiment will be explained using FIG. 27. First, the communication unit 304 of the virtual switch 310 outputs a notification to the requesting unit 307, which represents that an identified combination is not registered in the association data storage unit 313. Then, the requesting unit 307 transmits an allocation request that includes the tenant ID and the inner multicast address to the management apparatus 1 (step S91).

The allocation unit 15 of the management apparatus 1 receives the allocation request from the virtual switch 310 (step S93). When the combination of the tenant ID and the inner multicast address, which are included in the allocation request, is not registered in the association data storage unit 11, the allocation unit 15 fetches an outer multicast address from the address storage unit 12 (step S95). Then, the allocation unit 15 outputs the fetched outer multicast address to the transmitter 16.

The allocation unit 15 extracts the MAC address that corresponds to the tenant ID that is included in the allocation request from the management data storage unit 14 (step S97). Then, the allocation unit 15 outputs the extracted MAC address to the transmitter 16.

The transmitter 16 transmits an address notification that includes the tenant ID and the inner multicast address, which are included in the allocation request, and the outer multicast address to the extracted MAC address (step S99).

The transmitter 16 registers the outer multicast address in the association data storage unit 11 in association with the tenant ID and inner multicast address, which are included in the allocation request (step S101).

The communication unit 304 of the virtual switch (here, virtual switches 310 to 330) receives an address notification (step S103), and outputs the outer multicast address that is included in the address notification to the update unit 305. The update unit 305 registers the outer multicast address in the association data storage unit 313 in association with the tenant ID and the inner multicast address, which are included in the allocation request (step S105). Moreover, the update unit 305 of the virtual switch 310 registers the port identifier of the port that received the IGMP Report in association with the outer multicast address, in the multicast table storage unit 314 (step S107).

By performing the aforementioned processing, it becomes possible to quickly perform setting of virtual switches that are related to the tenant ID of a newly built multicast domain.

Although the embodiments of this invention were explained, this invention is not limited to those. For example, the aforementioned functional block configurations of the management apparatus 1, virtual switches 310 to 330 and physical switch 5 do not always correspond to program module configurations.

Moreover, the respective formats of the aforementioned tables are mere examples, and may be changed. Furthermore, as for the processing flow, as long as the processing results do not change, the turns of the steps may be exchanged or the steps may be executed in parallel.

Moreover, when data received from the VM does not contain the tenant ID, the tenant ID may be extracted as follows: In other words, a table or the like, which stores an identifier of the VM as correlated with the tenant ID in the virtual switches 310 to 330 may be provided in advance, and when the virtual switches 310 to 330 receive the data, the tenant ID corresponding to the identifier of the VM that is the transmission source of the data may be extracted from such a table.

Moreover, the address notification is transmitted to the virtual switch in the second embodiment. However, the address notification may be transmitted not only to the virtual switch but also to the physical switch 5. In the embodiments, this is because the outer multicast address which is being used in the system illustrated in FIG. 1 is registered in the association data storage unit 51 of the physical switch 5.

In addition, the aforementioned management apparatus 1 and servers 301 to 303 are computer devices as illustrated in FIG. 28. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 28. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

Figure 29:
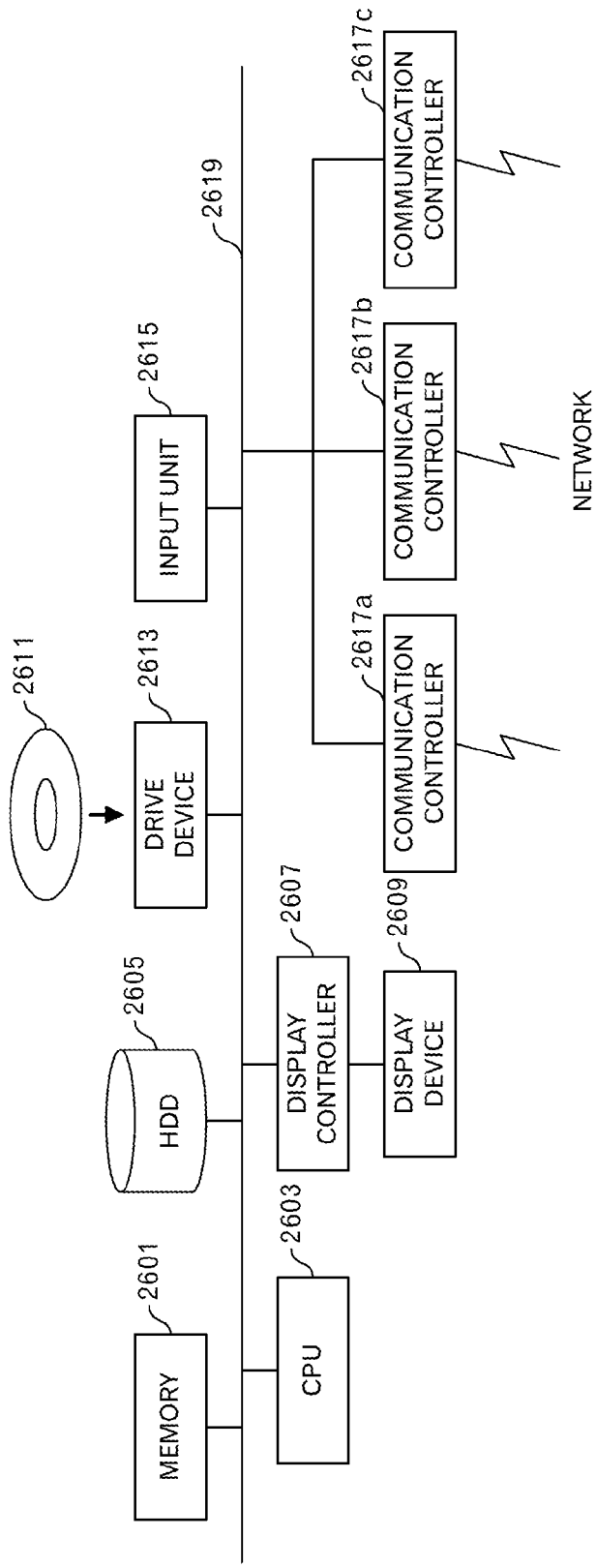
FIG. 29 is a functional block diagram of a relay apparatus implemented by a computer.

In addition, in the aforementioned physical switch 5, as illustrated in FIG. 29, a memory 2601, CPU 2603, Hard Disk Drive (HDD) 2605, display controller 2607 to be coupled with a display device 2609, drive device 2613 for a removable disk 2611, input device 2615 and communication units 2617 (2617a to 2617c in FIG. 29) for coupling to a network may be coupled with a bus 2619. Incidentally, according to circumstances, the display controller 2607, display device 2609, drive device 2613 and input device 2615 may not be included. The OS and application programs for carrying out a processing in these embodiments are stored in the HDD 2605, and read out from the HDD 2605 to the memory 2601 when being executed by the CPU 2603. If necessary, the CPU 2603 controls the display controller 2607, communication unit 2617 and drive device 2613 to carry out necessary operations. Incidentally, data that was inputted through any one of the communication units 2617 is outputted through another communication unit 2617. The CPU 2603 controls the communication units 2617 to appropriately switch output destinations. In addition, data during the processing is stored in the memory 2601, and stored in the HDD 2605 if necessary. In the embodiments of this technique, the application programs for carrying out the aforementioned processing are distributed by a computer-readable removable disk 2611 storing the application programs, and the application programs are installed into the HDD 2605 through the drive device 2613. The application programs may be installed into the HDD 2605 through the communication unit 2617 and the network such as the Internet. Such a computer apparatus realizes the aforementioned various functions by cooperating the hardware such as the CPU 2603, memory 2601 and the like with the OS and the application programs if necessary.

The aforementioned embodiments of this invention are outlined as follows:

An information processing apparatus relating to a first aspect of the embodiments has (A) an allocation unit that allocates, upon receipt of an allocation request including a first multicast address and a first tenant identification information from a relay apparatus, a second multicast address that is a multicast address, which is not allocated to any multicast domains, to a multicast domain identified by a combination of the first multicast address and the first tenant identification information; and (B) a transmission unit that transmits the second multicast address to at least the relay apparatus that is a transmission source of the allocation request.

By employing the aforementioned configuration, it becomes possible to carryout a relay processing using the second multicast address without an administrator setting the relay apparatus. Namely, it becomes possible to automatically build appropriate multicast domains in a multi-tenant network. Moreover, it is possible to prevent from assigning the same multicast address to plural multicast domains.

Moreover, this information processing apparatus may further have (C) a data storage unit storing an address of a relay apparatus in association with a tenant identification information. In such a case, the aforementioned transmission unit may (b1) extract an address of a relay apparatus, which is stored in association with the first tenant identification information, from the data storage unit, and (b2) transmit the second multicast address to the extracted address. With such a configuration, because the second multicast address is sent to the relay apparatus associated with the first tenant identification information, appropriate multicast domains can be built.

A relay apparatus relating to a second aspect of the embodiments includes: (D) a data storage unit storing an allocated multicast address allocated to a multicast domain identified by a combination of a multicast address and tenant identification information in association with the combination; (E) a transmission unit that transmits an allocation request including a first multicast address and first tenant identification information to a management apparatus managing allocation of allocated multicast addresses; and (F) a storing processing unit that stores, upon receipt of a first allocated multicast address allocated to a multicast domain identified by a combination of the first multicast address and the first tenant identification information from the management apparatus, the first allocated multicast address in the data storage unit in association with the combination of the first multicast address and the first tenant identification information.

With this configuration, it becomes possible to carry out a relay processing using the allocated multicast address without an administrator setting the relay apparatus. In other words, it becomes possible to automatically build appropriate multicast domains in the multi-tenant network.

Moreover, upon receipt of an Internet Group Management Protocol (IGMP) report from a first apparatus, (e1) the aforementioned transmission unit may generate the allocation request including the first multicast address obtained from a multicast IP address included in the IGMP report and the first tenant identification information that is tenant identification information of the first apparatus. With this configuration, it becomes possible to appropriately build multicast domains in a network in which the multicast data is transferred in the IGMP.

Moreover, this relay apparatus may have (G) a second data storage unit storing a multicast address in association with a port identifier. Then, the aforementioned storing processing unit may (f1) store the first multicast address in the second data storage unit in association with an identifier of a port that received the IGMP report. With this configuration, it is possible to transfer the multicast data to an apparatus that requests the multicast data.

Moreover, this relay apparatus may further include (H) an attaching unit that extracts, upon receipt of multicast data to which the allocated multicast address is not attached, an allocated multicast address corresponding to a combination of a multicast address and tenant identification information, which are obtained from the multicast data, from the data storage unit, and attaches the extracted allocated multicast address to the multicast data; and (I) an output unit that extracts a port identifier corresponding to a multicast address obtained from the multicast data from the second data storage unit, and outputs multicast data to which the extracted allocated multicast address is attached, to a port identified by the extracted port identifier. With this configuration, it becomes possible to transfer the multicast data from an apparatus belonging to a multicast domain to that multicast domain.

Furthermore, upon receipt of the multicast data to which the allocated multicast address is attached, the aforementioned output unit may (ii) extract a multicast address corresponding to the allocated multicast address from the data storage unit, extract a port identifier corresponding to the extracted multicast address from the second data storage unit, and output the multicast data to a port identified by the extracted port identifier. With this configuration, it becomes possible to appropriately transfer the multicast data to which the allocated multicast address is attached.

Furthermore, this relay apparatus may further have (J) a second data storage unit storing an allocated multicast address in association with a port identifier; and (K) an output unit that extracts, upon receipt of multicast data to which an allocated multicast address is attached, a port identifier corresponding to the allocated multicast address from the second data storage unit, and outputs the multicast data to a port identified by the extracted port identifier. With this configuration, it becomes possible to transfer the multicast data to which the allocated multicast address is attached by using only the allocated multicast address (in other words, without any multicast address).

Moreover, this relay apparatus may further have (L) a transmission unit that transmits, upon receipt of an IGMP query including the first multicast address, an IGMP report including the first multicast address to an apparatus of a transmission source of the IGMP query. With this configuration, there is no need to transmit an IGMP query to subordinate apparatuses by the relay apparatus, and there is no need to respond to any IGMP report from the subordinate apparatuses. Therefore, it becomes possible to reduce the processing load of the relay apparatus.

An information processing system relating to a third aspect of the embodiments has (M) a relay apparatus and (N) a management apparatus. Then, the aforementioned relay apparatus includes: (m1) a data storage unit storing an allocated multicast address allocated to a multicast domain identified by a combination of a multicast address and tenant identification information in association with the combination; (m2) a first transmission unit that transmits an allocation request including a first multicast address and first tenant identification information to the management apparatus; and (m3) a storing processing unit that stores, upon receipt of a first allocated multicast address allocated to a multicast domain identified by a combination of the first multicast address and the first tenant identification information from the management apparatus, the first allocated multicast address in the data storage unit in association with the combination of the first multicast address and the first tenant identification information. Moreover, the aforementioned management apparatus has (n1) an allocation unit that allocates, upon receipt of the allocation request from the relay apparatus, the first allocated multicast address that is a multicast address, which is not allocated to any multicast domains, to a multicast domain identified by a combination of the first multicast address and the first tenant identification information; and (n2) a second transmission unit that transmits the first allocated multicast address to at least the relay apparatus that is a transmission source of the allocation request.

With this configuration, it is possible to carry out a relay processing using the allocated multicast address, without the administrator setting the relay apparatus. Namely, it becomes possible to automatically build appropriate multicast domains in the multi-tenant network.

An information processing method relating to a fourth aspect of the embodiments includes (O) upon receipt of an allocation request including a first multicast address and a first tenant identification information from a relay apparatus, allocating a second multicast address that is a multicast address, which is not allocated to any multicast domains, to a multicast domain identified by a combination of the first multicast address and the first tenant identification information; and (P) transmitting the second multicast address to at least the relay apparatus that is a transmission source of the allocation request.

An information processing method relating to a fifth aspect of the embodiments includes (Q) transmitting an allocation request including a first multicast address and first tenant identification information to a management apparatus managing allocation of allocated multicast addresses; and (R) upon receipt of a first allocated multicast address allocated to a multicast domain identified by a combination of the first multicast address and the first tenant identification information from the management apparatus, storing the first allocated multicast address in association with the combination of the first multicast address and the first tenant identification information, in a data storage unit storing an allocated multicast address allocated to a multicast domain identified by a combination of a multicast address and tenant identification information in association with the combination.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus, comprising:
a first data storage unit configured to store a multicast address in association with a combination of another multicast address and tenant identification information;
a reception unit configured to receive, from a relay apparatus that relays first packets transmitted from virtual machines belonging to a first multicast domain, an allocation request including a first multicast address and first tenant identification information which are included in the first packets;
a determination unit configured to determine whether a combination of the first multicast address and the first tenant identification information is stored in the first data storage unit;
an extraction unit configured to extract, upon determining that the combination of the first multicast address and the first tenant identification information is not stored in the first data storage unit, a second multicast address which is to be attached to the first packets by the relay apparatus;
a transmission unit configured to transmit the second multicast address to the relay apparatus that is a transmission source of the allocation request; and
a registration unit configured to register, in the first data storage unit, the second multicast address in association with the combination of the first multicast address and the first tenant identification information.

2. The information processing apparatus as set forth in claim 1, further comprising:
a second data storage unit configured to store an address of a relay apparatus in association with tenant identification information, and wherein
the transmission unit is further configured to extract an address of the relay apparatus, which is stored in association with the first tenant identification information, from the second data storage unit, and
the transmission unit is further configured to transmit the second multicast address to the extracted address.

3. A relay apparatus, comprising:
a first data storage unit configured to store an allocated multicast address allocated to a multicast domain identified by a combination of a multicast address and tenant identification information in association with the combination;
a second data storage unit configured to store a multicast address in association with a port identifier;
a first transmission unit configured to transmit, to a management apparatus managing allocation of multicast addresses, an allocation request including a first multicast address and first tenant identification information;

a storing processing unit configured to store, upon receipt of a first allocated multicast address which has been allocated to a first multicast domain identified by a combination of the first multicast address and the first tenant identification information, the first allocated multicast address in the first data storage unit in association with the combination of the first multicast address and the first tenant identification information;

an attaching unit configured to extract, upon receipt of first multicast data to which an allocated multicast address is not attached, a second allocated multicast address corresponding to a combination of a second multicast address and second tenant identification information which are obtained from the first multicast data, from the first data storage unit, and attach the second allocated multicast address to the first multicast data; and a first output unit configured to extract, from the second data storage unit, a port identifier corresponding to the second multicast address, and output the first multicast data to a port identified by the extracted port identifier.

4. The relay apparatus as set forth in claim 3, wherein, upon receipt of an Internet Group Management Protocol (IGMP) report from a first apparatus, the first transmission unit is further configured to generate the allocation request including the first multicast address obtained from a multicast IP address included in the IGMP report and the first tenant identification information that is tenant identification information of the first apparatus.

5. The relay apparatus as set forth in claim 4, wherein the storing processing unit is further configured to store the first multicast address in the second data storage unit in association with an identifier of a port that received the IGMP report.

6. The relay apparatus as set forth in claim 5, further comprising:
a third data storage unit configured to store an allocated multicast address in association with a port identifier; and
a second output unit configured to extract, upon receipt of second multicast data to which a third allocated multicast address is attached, a port identifier corresponding to the third allocated multicast address from the third data storage unit, and output the second multicast data to a port identified by the extracted port identifier.

7. The relay apparatus as set forth in claim 3, wherein, upon receipt of second multicast data to which a third allocated multicast address is attached, the first output unit is further configured to extract a third multicast address corresponding to the third allocated multicast address from the first data storage unit, extract a port identifier corresponding to the third multicast address from the second data storage unit, and output the second multicast data to a port identified by the extracted port identifier.

8. The relay apparatus as set forth in claim 3, further comprising a second transmission unit configured to transmit, upon receipt of an IGMP query including the first multicast address, an IGMP report including the first multicast address to an apparatus that is a transmission source of the IGMP query.

9. An information processing system, comprising:
a relay apparatus; and
a management apparatus, and wherein the relay apparatus comprises:
a first data storage unit configured to store an allocated multicast address allocated to a multicast domain identified by a combination of a multicast address and tenant identification information in association with the combination;

a second data storage unit configured to store a multicast address in association with a port identifier;

a first transmission unit configured to transmit, to the management apparatus, an allocation request including a first multicast address and first tenant identification information;

a storing processing unit configured to store, upon receipt of a first allocated multicast address which has been allocated to a first multicast domain identified by a combination of the first multicast address and the first tenant identification information, the first allocated multicast address in the first data storage unit in association with the combination of the first multicast address and the first tenant identification information;

an attaching unit configured to extract, upon receipt of first multicast data to which an allocated multicast address is not attached, a second allocated multicast address corresponding to a combination of a second multicast address and second tenant identification information which are obtained from the first multicast data, from the first data storage unit, and attach the second allocated multicast address to the first multicast data; and an output unit configured to extract, from the second data storage unit, a port identifier corresponding to the second multicast address, and output the first multicast data to a port identified by the extracted port identifier, and the management apparatus comprises:
an allocation unit configured to allocate, upon receipt of the allocation request from the relay apparatus, the first allocated multicast address which has not been allocated to any multicast domains, to the first multicast domain;

a second transmission unit configured to transmit the first allocated multicast address to the relay apparatus that is a transmission source of the allocation request; and a registration unit configured to register the first allocated multicast address in association with the combination of the first multicast address and the first tenant identification information.

10. A computer-readable, non-transitory storage medium storing a program for causing a computer to execute a process, the process comprising:
receiving, from a relay apparatus that relays first packets transmitted from virtual machines belonging to a first multicast domain, an allocation request including a first multicast address and first tenant identification information which are included in the first packets;

determining whether a combination of the first multicast address and the first tenant identification information is stored in a data storage unit storing a multicast address in association with a combination of another multicast address and tenant identification information;

upon determining that the combination of the first multicast address and the first tenant identification information is not stored in the data storage unit, extracting a second multicast address which is to be attached to the first packet by the relay apparatus;

transmitting the second multicast address to the relay apparatus that is a transmission source of the allocation request; and registering, in the data storage unit, the second multicast address in association with the combination of the first multicast address and the first tenant identification information.

11. An information processing method, comprising:

receiving, by using a computer and from a relay apparatus that relays first packets transmitted from virtual machines belonging to a first multicast domain, an allocation request including a first multicast address and first tenant identification information which are included in the first packets;

determining, by using the computer, whether a combination of the first multicast address and the first tenant identification information is stored in a data storage unit storing a multicast address in association with a combination of another multicast address and tenant identification information;

upon determining that the combination of the first multicast address and the first tenant identification information is not stored in the data storage unit, extracting, by using the computer, a second multicast address which is to be attached to the first packets by the relay apparatus;

transmitting, by using the computer, the second multicast address to the relay apparatus that is a transmission source of the allocation request; and registering, by using the computer and in the data storage unit, the second multicast address in association with the combination of the first multicast address and the first tenant identification information.

12. A computer-readable, non-transitory storage medium storing a program for causing a computer to execute a process, the process comprising:

transmitting, to a management apparatus managing allocation of multicast addresses, an allocation request including a first multicast address and first tenant identification information; and upon receipt of a first allocated multicast address which has been allocated to a first multicast domain identified by a combination of the first multicast address and the first tenant identification information, storing the first allocated multicast address in association with the combination of the first multicast address and the first tenant identification information, in a first data storage unit storing an allocated multicast address allocated to a multicast domain identified by a combination of a multicast address and tenant identification information in association with the combination;

upon receipt of first multicast data to which an allocated multicast address is not attached, first extracting a second allocated address corresponding to a combination of a second multicast address and second tenant identification information which are obtained from the first multicast data, from the first data storage unit;

attaching the second allocated multicast address to the first multicast data; and second extracting, from a second data storage unit storing a multicast address in association with a port identifier, a port identifier corresponding to the second multicast address, and outputting the first multicast data to a port identified by the extracted port identifier.

13. An information processing method, comprising:

transmitting, by using a computer and to a management apparatus managing allocation of multicast addresses, an allocation request including a first multicast address and first tenant identification information; and upon receipt of a second multicast address which has been allocated to a first multicast domain identified by a combination of the first multicast address and the first tenant identification information, storing, by using the computer, the second multicast address in association with the combination of the first multicast address and the first tenant identification information, in a first data storage unit storing an allocated multicast address allocated to a multicast domain identified by a combination of a multicast address and tenant identification information in association with the combination;

upon receipt of first multicast data to which an allocated multicast address is not attached, first extracting, by using the computer, a second allocated address corresponding to a combination of a second multicast address and second tenant identification information which are obtained from the first multicast data, from the first data storage unit;

attaching, by using the computer, the second allocated multicast address to the first multicast data; and second extracting, by using the computer and from a second data storage unit storing a multicast address in association with a port identifier, a port identifier corresponding to the second multicast address, and outputting, by using the computer, the first multicast data to a port identified by the extracted port identifier.

* * * * *